(12) United States Patent
Jensen et al.

(10) Patent No.: US 11,892,037 B2
(45) Date of Patent: Feb. 6, 2024

(54) CLUTCH BASKET ASSEMBLY

(71) Applicant: REKLUSE RACING LLC, Boise, ID (US)

(72) Inventors: Karl E. Jensen, Boise, ID (US); Dayne Konrad, Boise, ID (US); Jacob Good, Boise, ID (US); Ian Shelman, Boise, ID (US); Gabriel Sutherland, Boise, ID (US); Christopher Bidondo, Boise, ID (US); Sean G. Brown, Boise, ID (US)

(73) Assignee: Rekluse Racing LLC, Boise, ID (US)

( * ) Notice: Subject to any disclaimer, the term of this patent is extended or adjusted under 35 U.S.C. 154(b) by 0 days.

(21) Appl. No.: 17/086,110

(22) Filed: Oct. 30, 2020

(65) Prior Publication Data

US 2021/0131504 A1 May 6, 2021

Related U.S. Application Data

(60) Provisional application No. 62/930,494, filed on Nov. 4, 2019.

(51) Int. Cl.
*F16D 13/52* (2006.01)
*F16D 13/64* (2006.01)

(52) U.S. Cl.
CPC .......... *F16D 13/52* (2013.01); *F16D 13/646* (2013.01); *F16D 13/648* (2013.01)

(58) Field of Classification Search
CPC ....... F16D 13/648; F16D 13/646; F16D 13/52
See application file for complete search history.

(56) References Cited

U.S. PATENT DOCUMENTS

| | | | | |
|---|---|---|---|---|
| 4,117,919 A | * | 10/1978 | Rupp | F16D 13/52 192/103 A |
| 2014/0174877 A1 | * | 6/2014 | Penz | F16D 13/683 192/70.12 |
| 2015/0345569 A1 | * | 12/2015 | Erhard | F16D 13/648 192/70.23 |
| 2017/0307026 A1 | * | 10/2017 | Bouton | B64D 35/00 |
| 2019/0226531 A1 | * | 7/2019 | Youngwerth | F16D 13/52 |

* cited by examiner

*Primary Examiner* — Stacey A Fluhart
(74) *Attorney, Agent, or Firm* — Scott Swanson; Shaver & Swanson

(57) ABSTRACT

An improved clutch basket assembly is disclosed. The improved clutch basket assembly provides improved wear resistance at the interfaces between friction discs and a clutch basket housing while allowing an operator to have improved clutch lever control and modulation when manually engaging or disengaging the clutch system. The improved clutch basket assembly includes a generally cylindrical clutch basket having a sidewall, a closed first end and an open second end. A plurality of removable pins is attached to the sidewall. A plurality of frictions disks is mounted in said clutch basket. The friction disks each have a plurality of positioning tabs extending out from a periphery of each of the friction disks. The positioning tabs are configured for engagement with at least one adjacent removable pin removably attached to the sidewall.

16 Claims, 30 Drawing Sheets

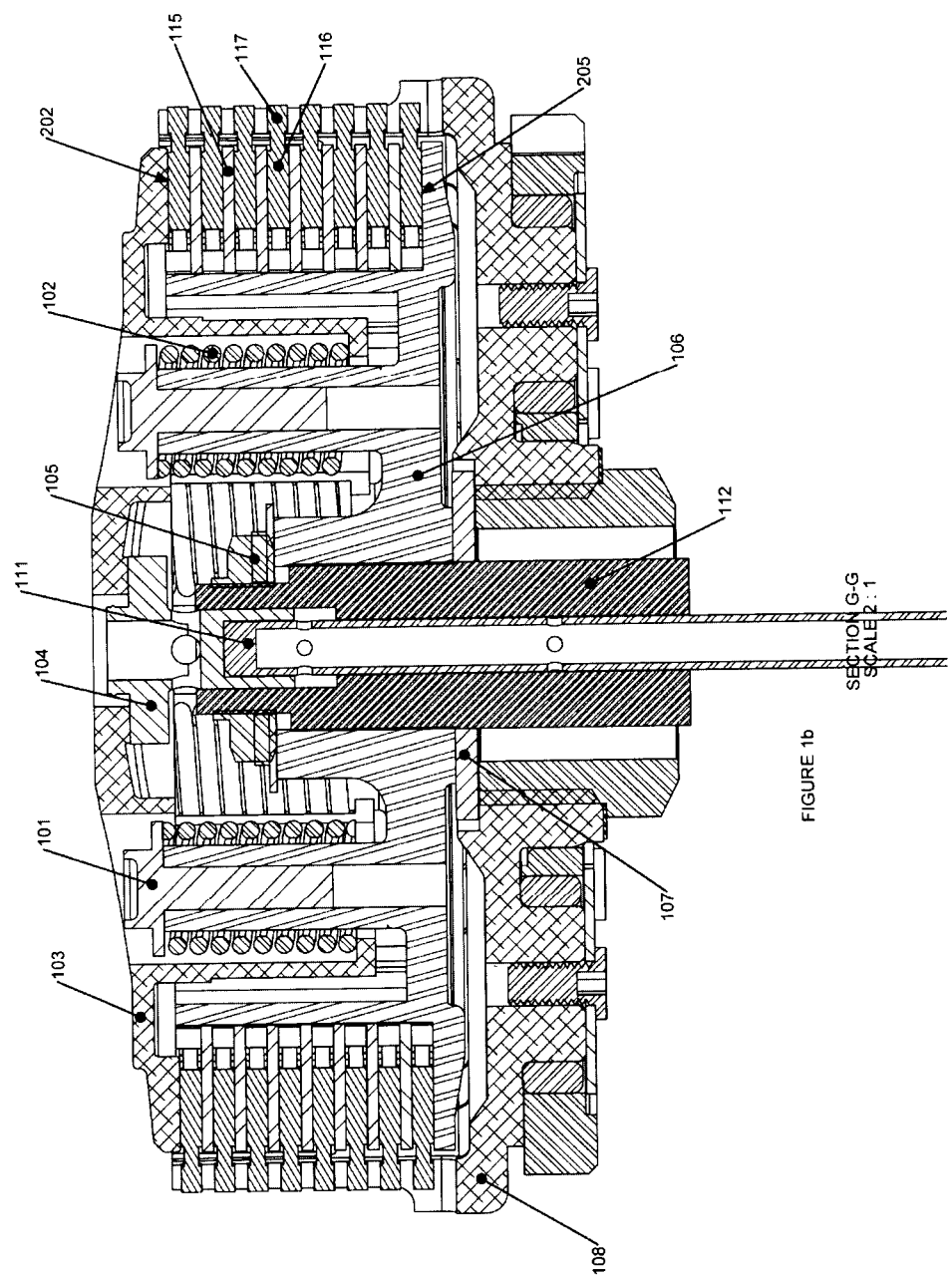

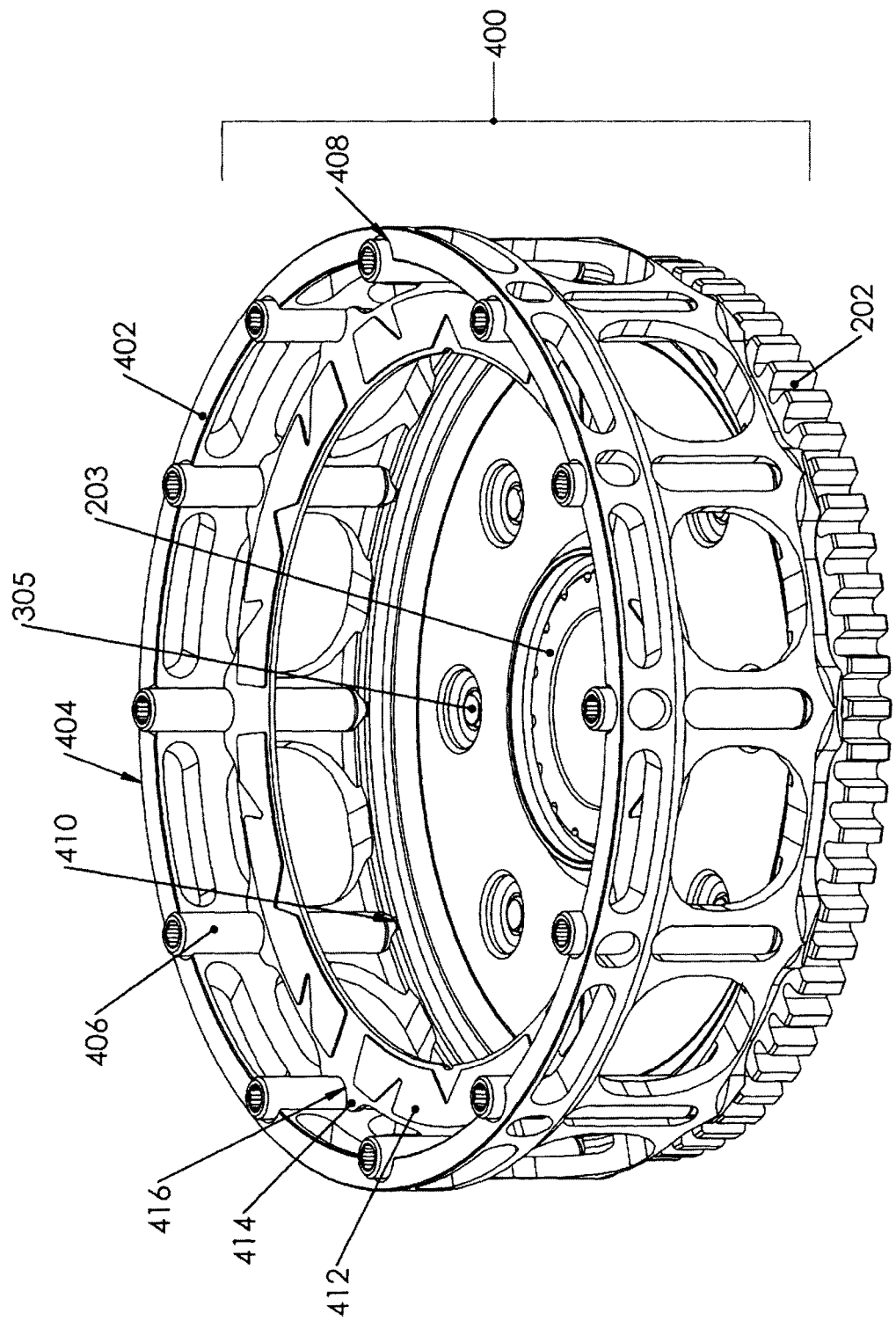
FIGURE 4.1

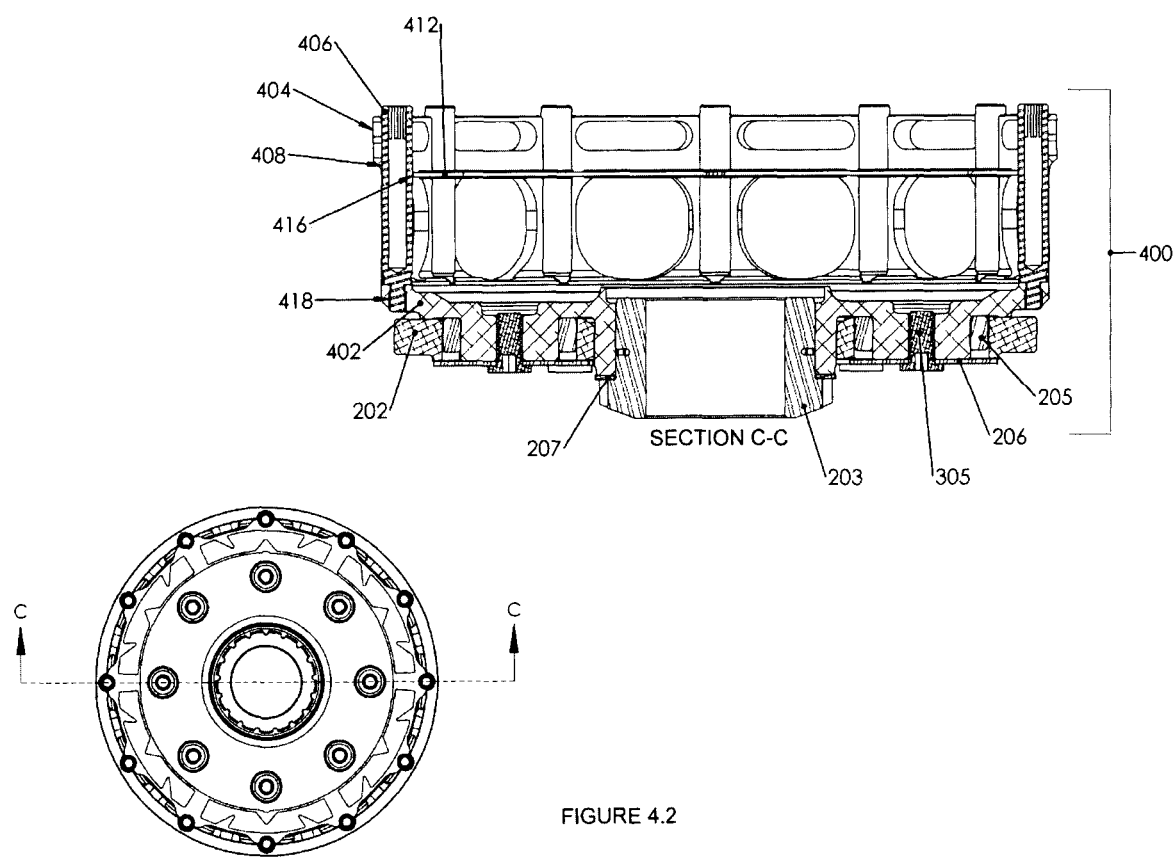
FIGURE 4.2

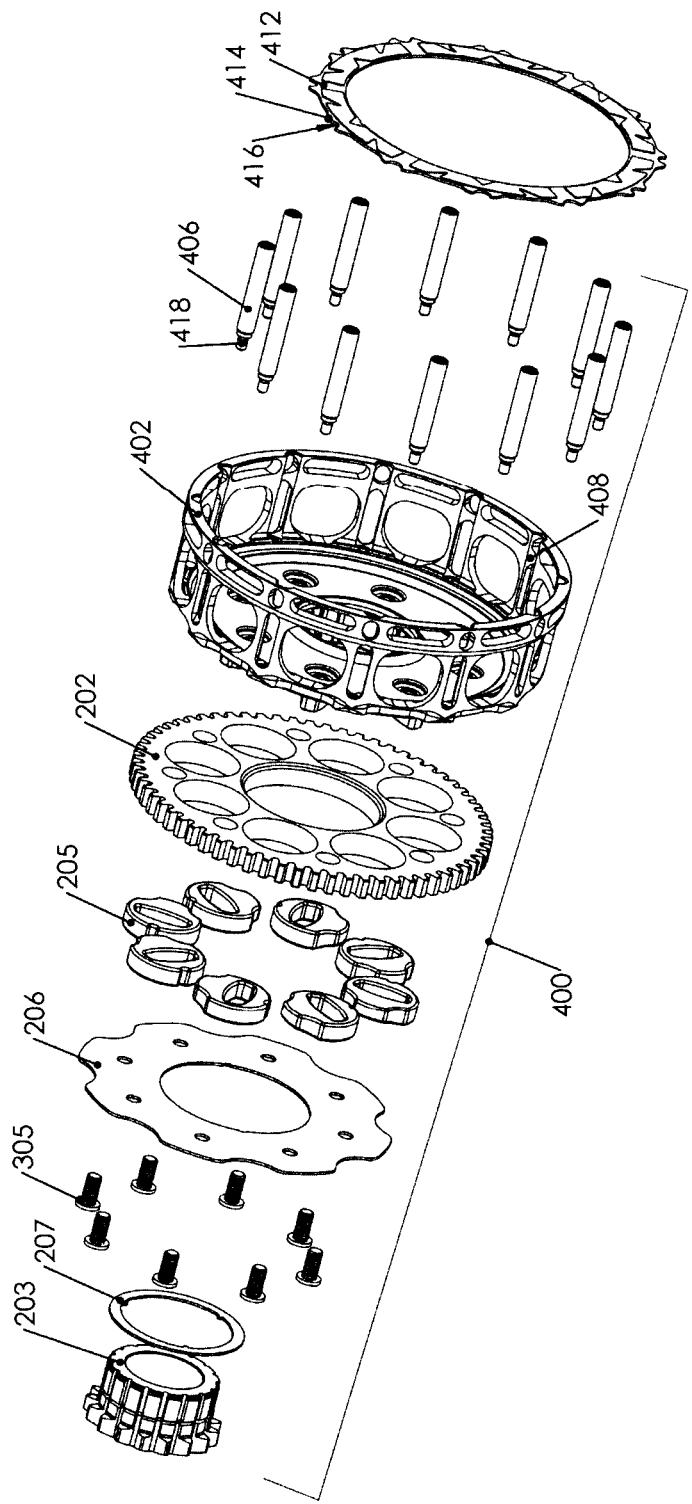
FIGURE 4.3

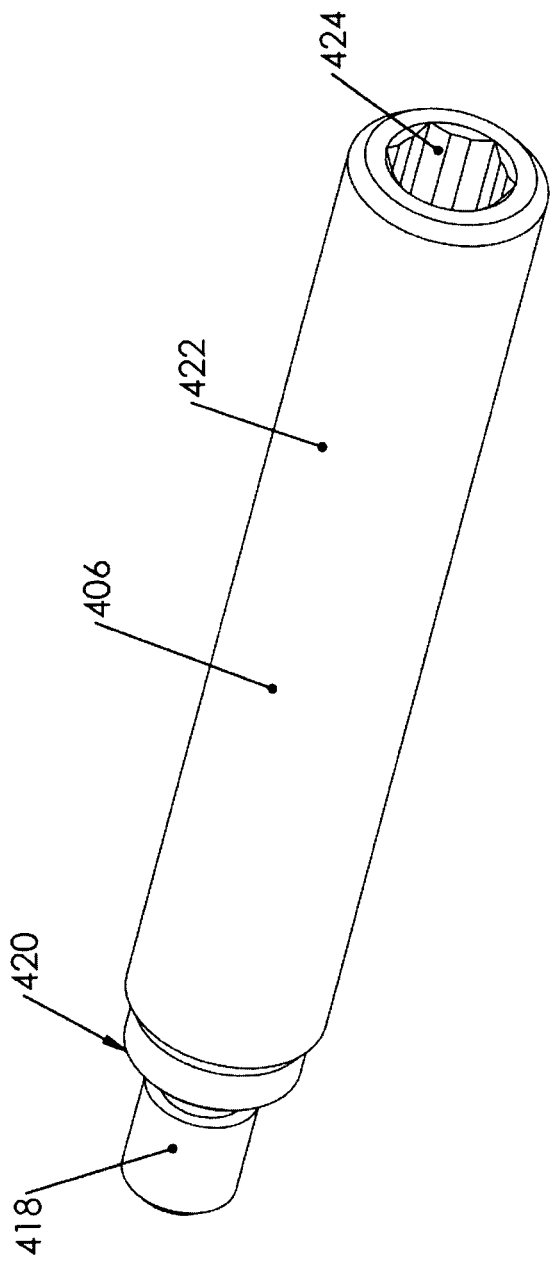
FIGURE 4.4

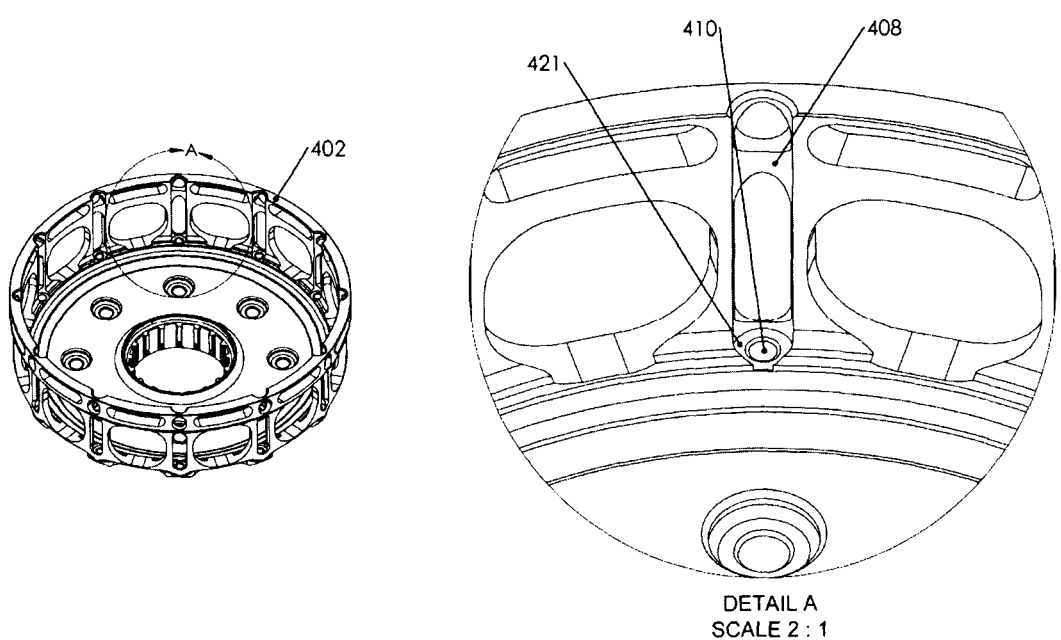
FIGURE 4.5

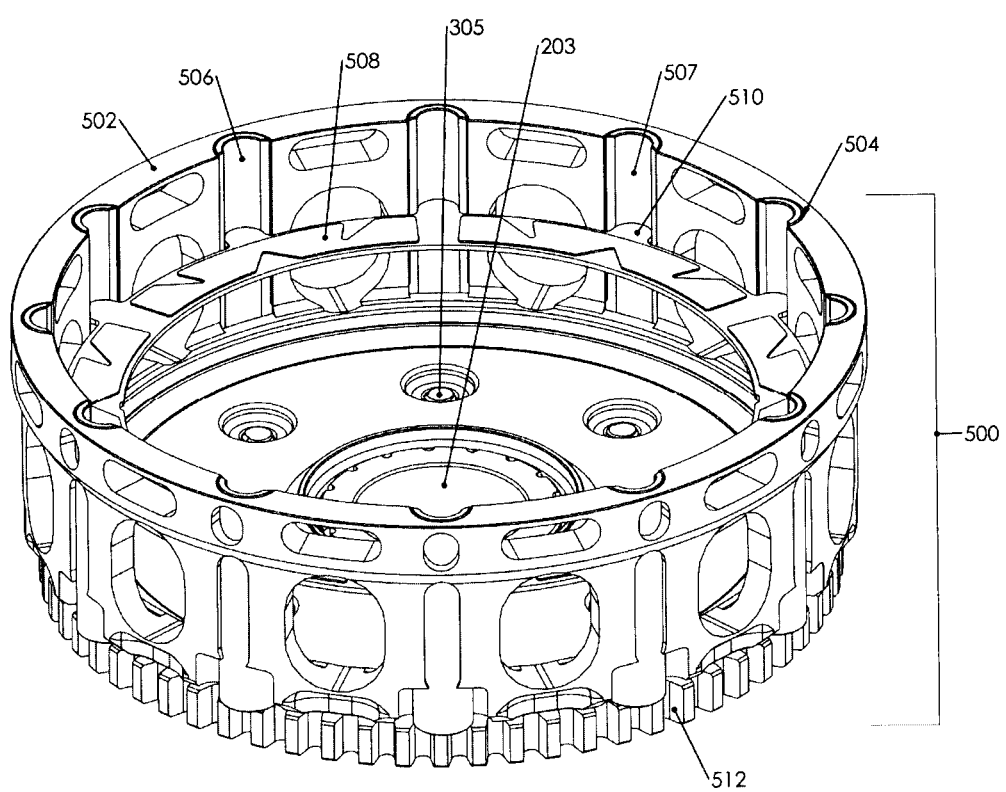
FIGURE 5.1

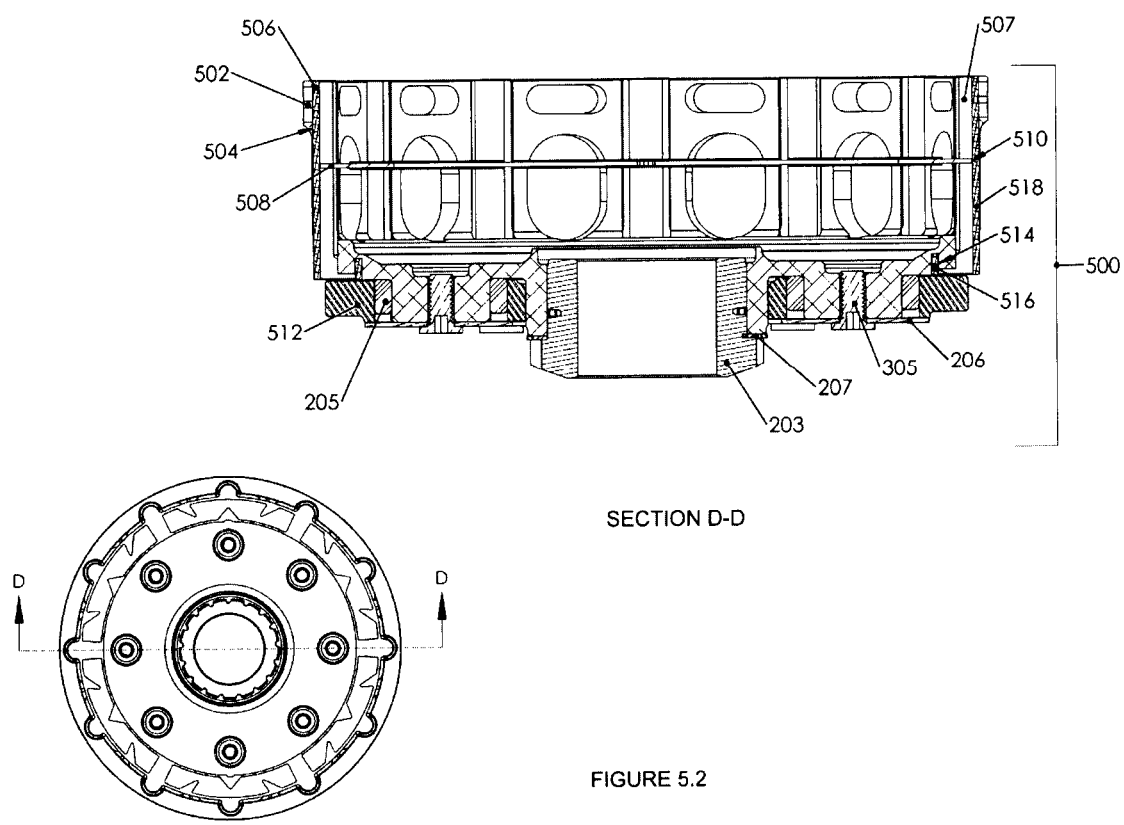
SECTION D-D
FIGURE 5.2

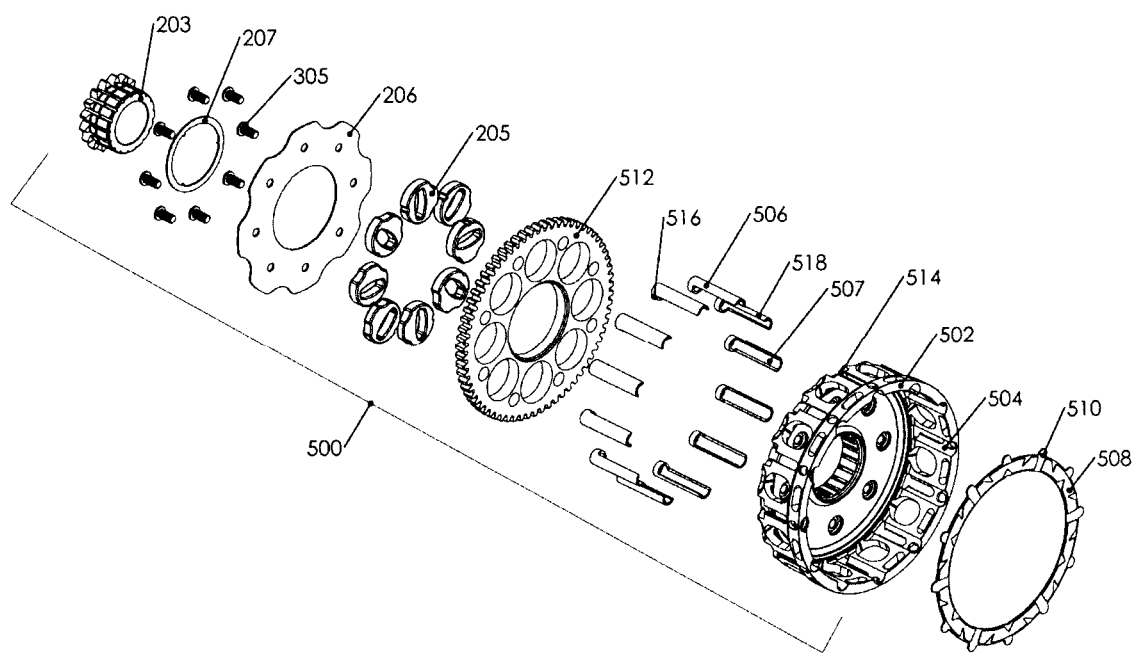
FIGURE 5.3

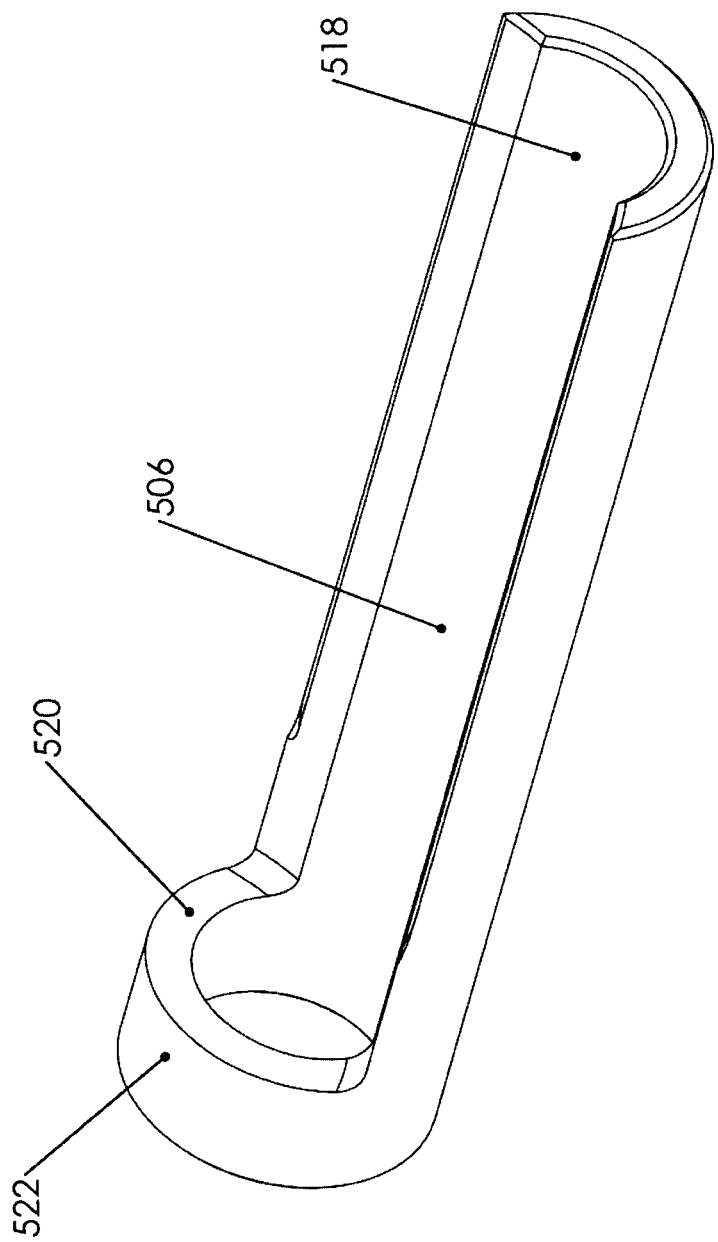
FIGURE 5.4

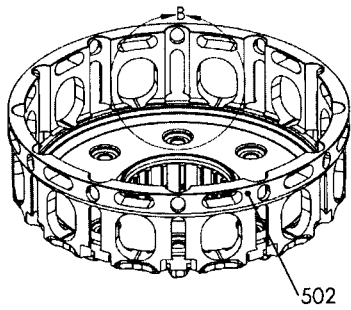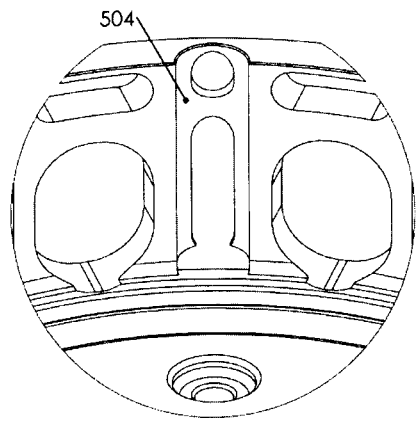
DETAIL B
SCALE 1.5 : 1
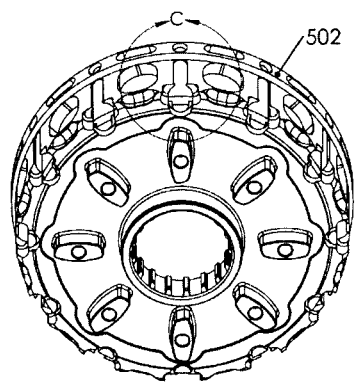
FIGURE 5.5
DETAIL C
SCALE 1.5 : 1

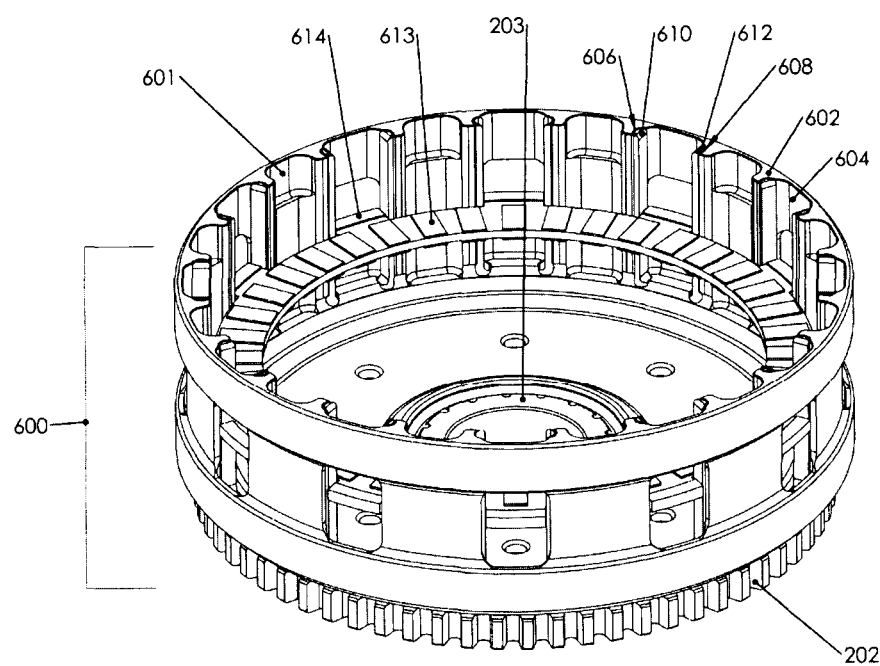
FIGURE 6.1

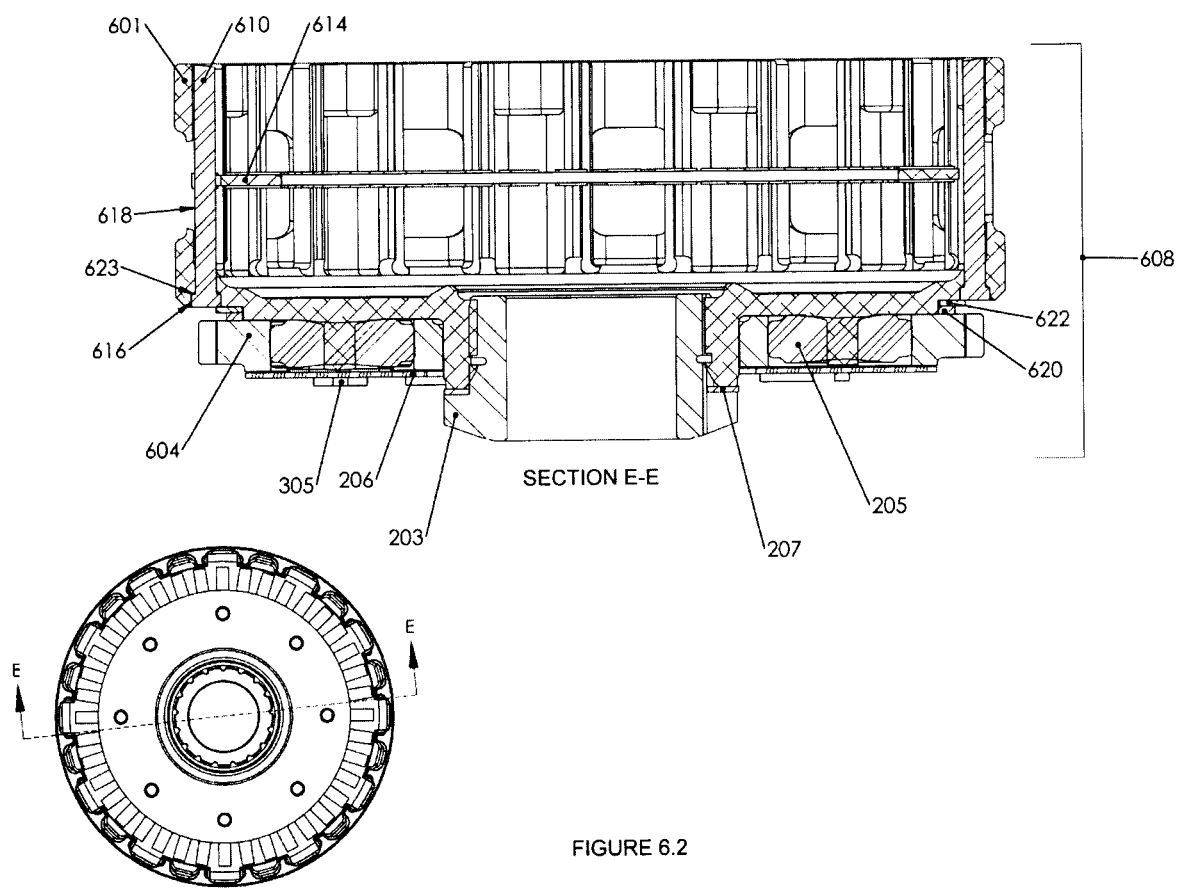
FIGURE 6.2

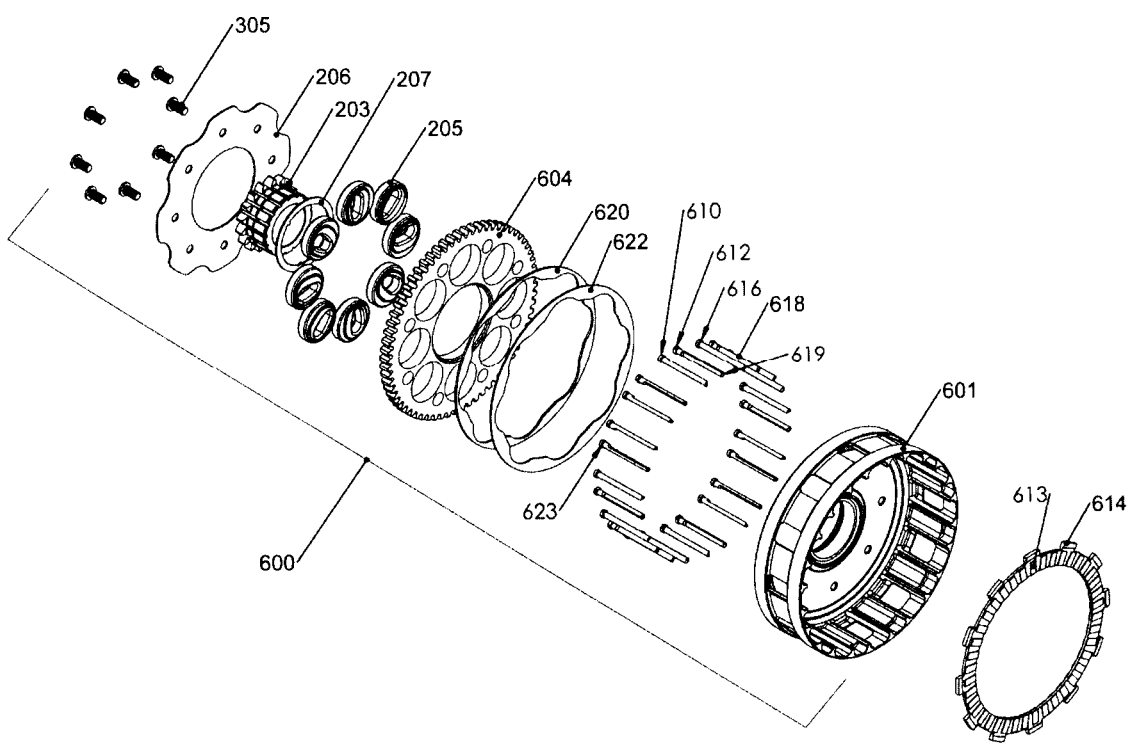
FIGURE 6.3

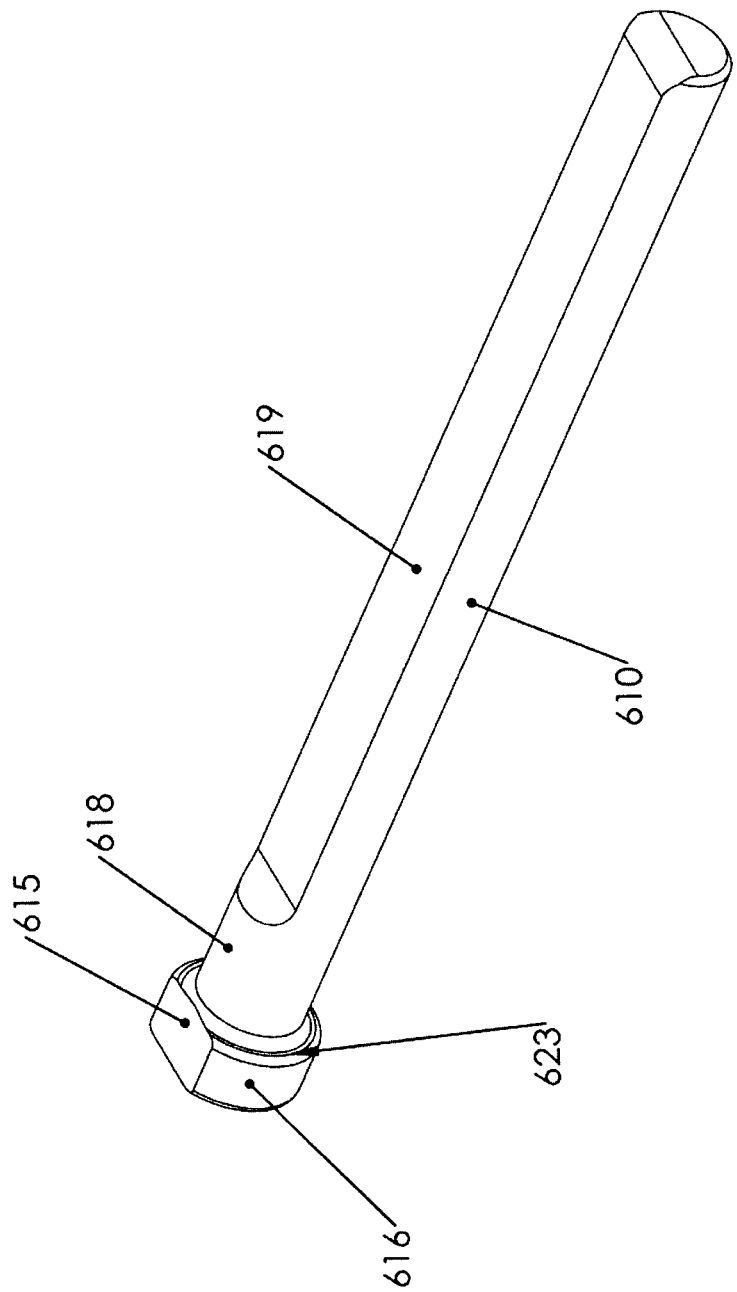
FIGURE 6.4

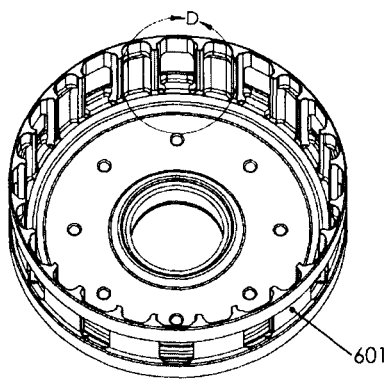
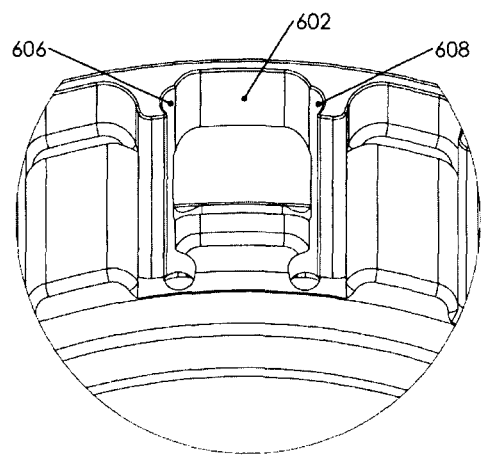
DETAIL D
SCALE 2 : 1
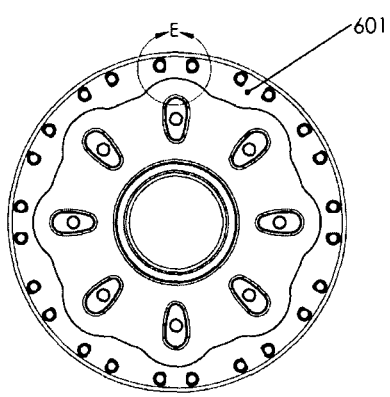
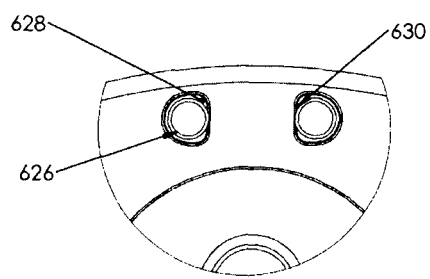
FIGURE 6.5
DETAIL E
SCALE 2 : 1

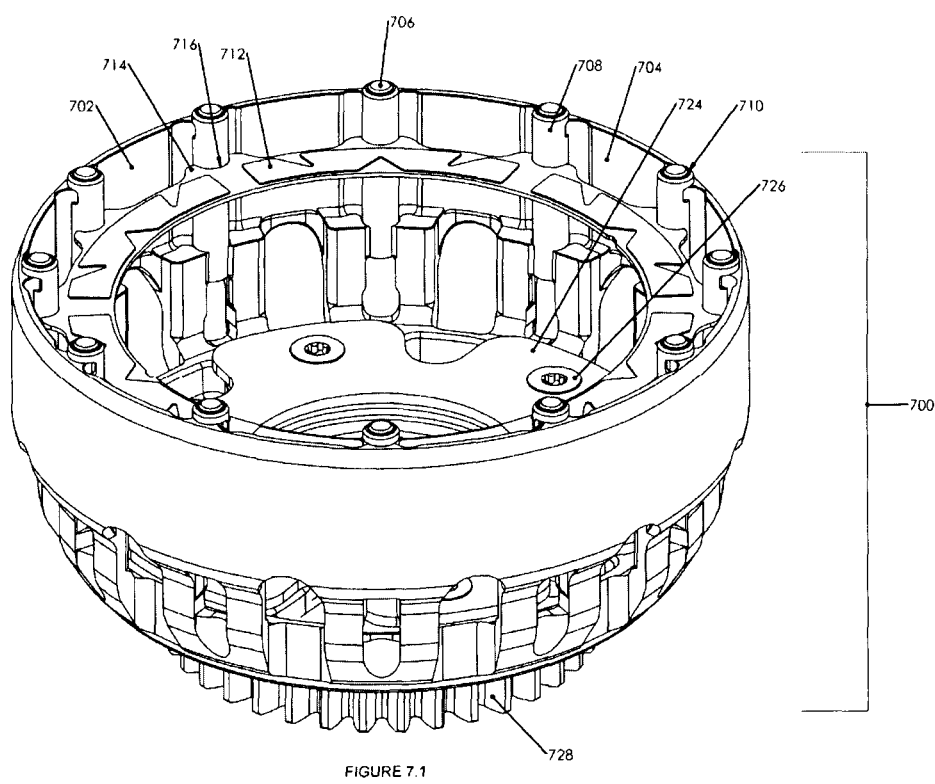
FIGURE 7.1

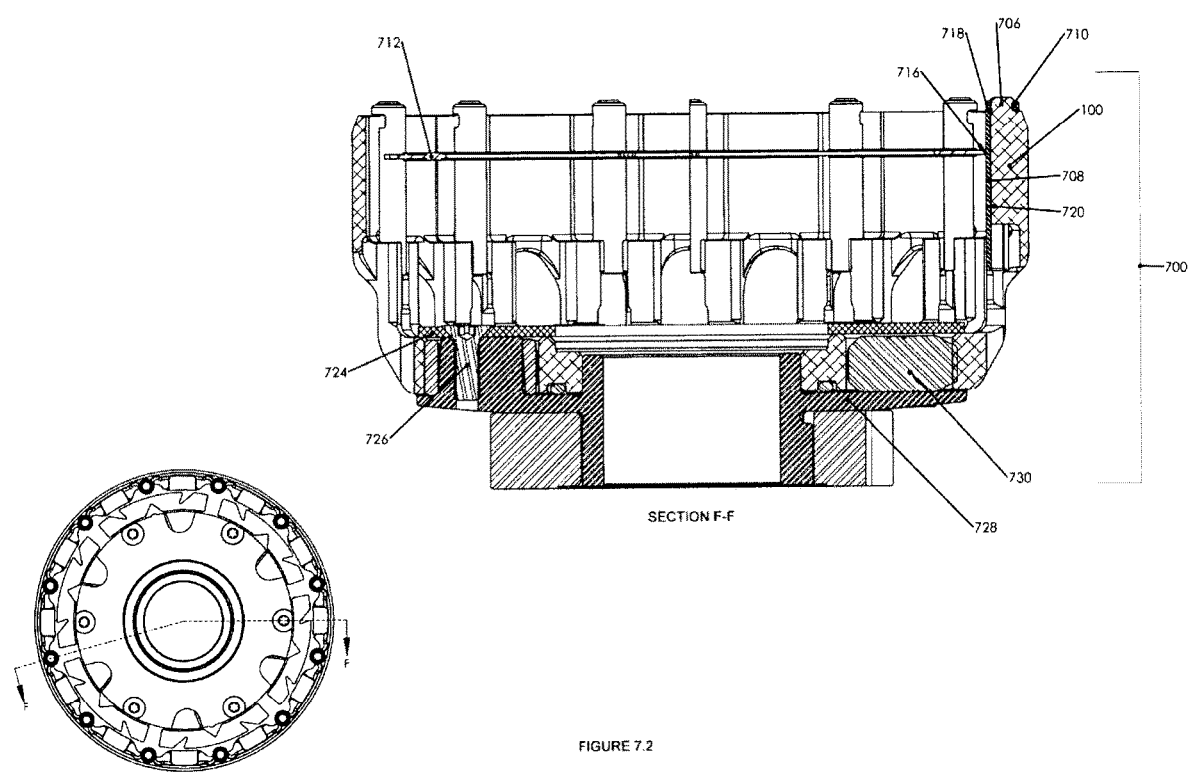
FIGURE 7.2

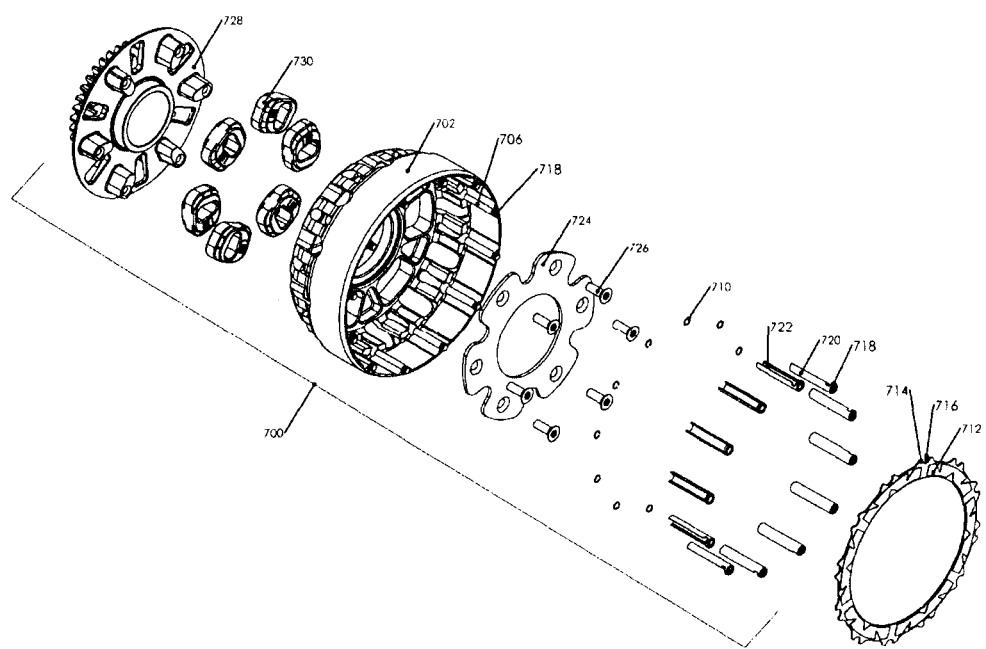
FIGURE 7.3

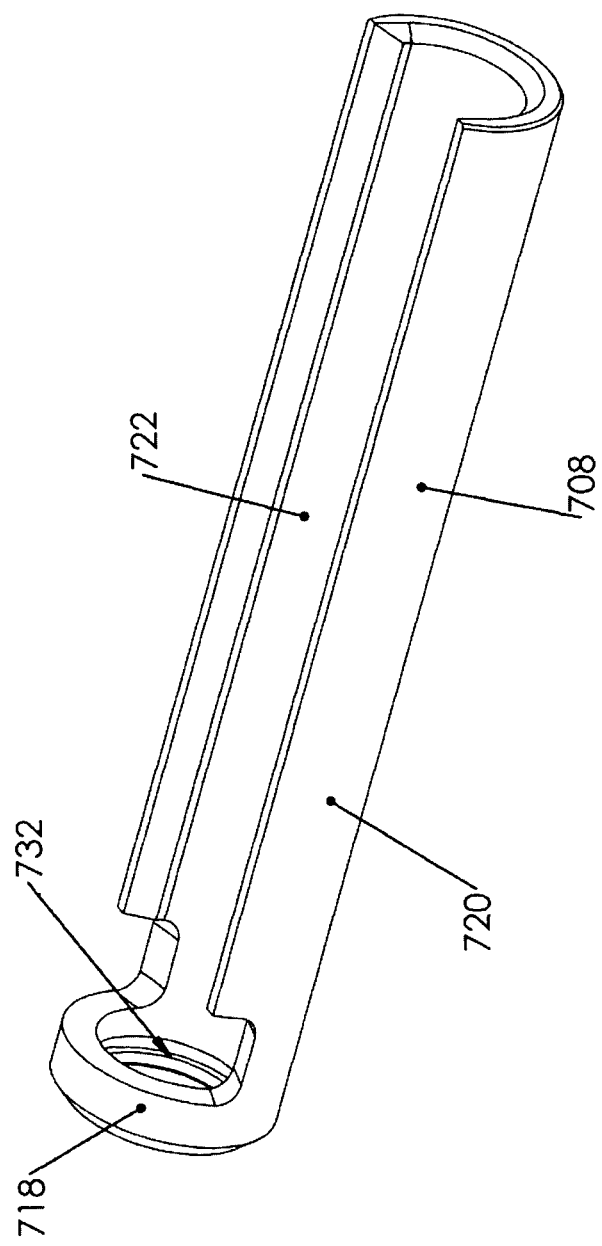
FIGURE 7.4

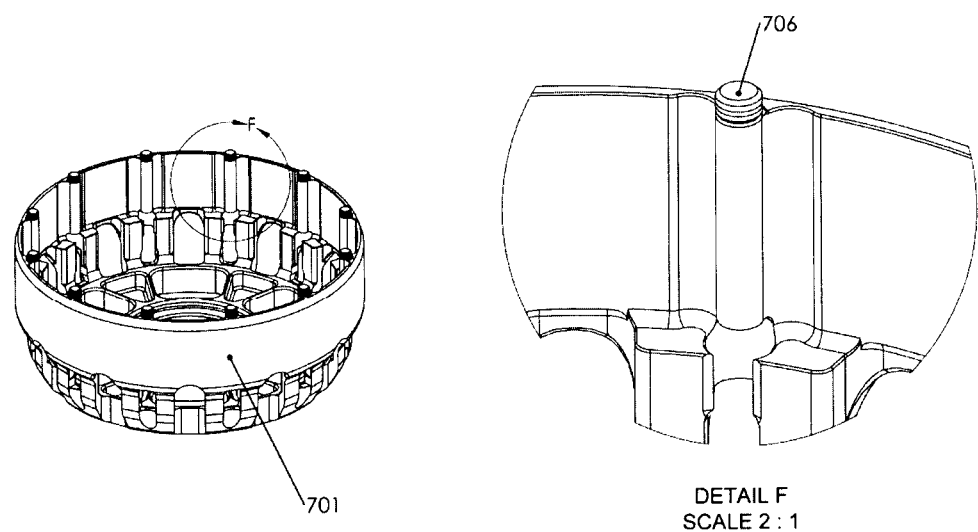
FIGURE 7.5

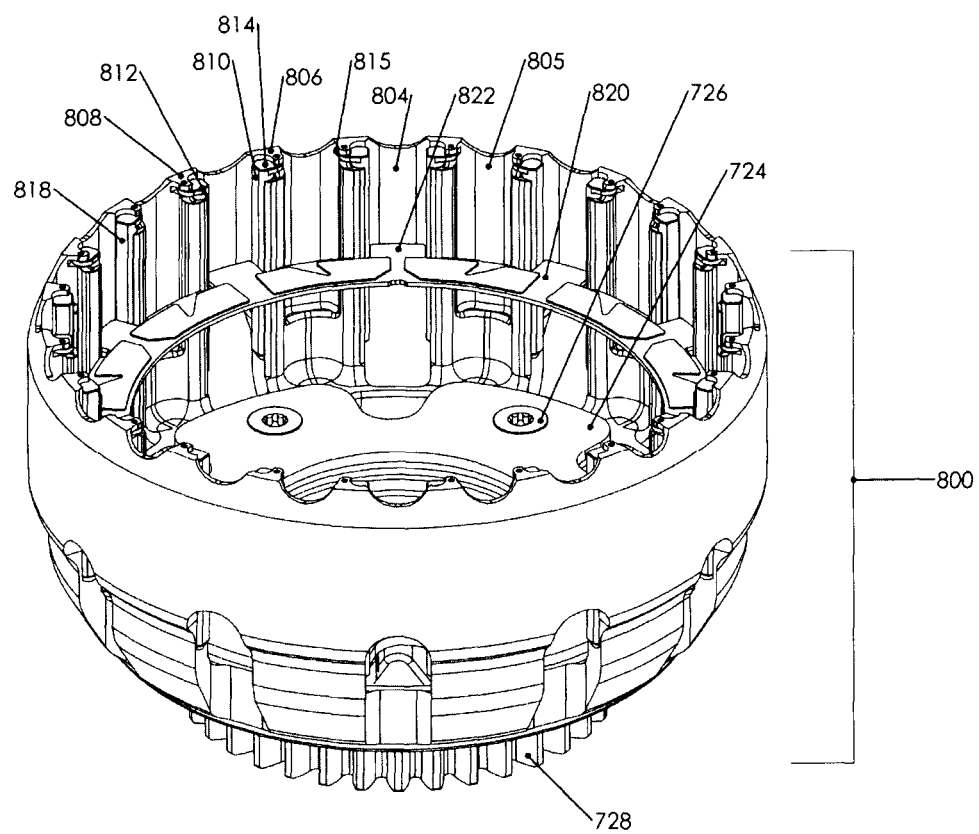
FIGURE 8.1

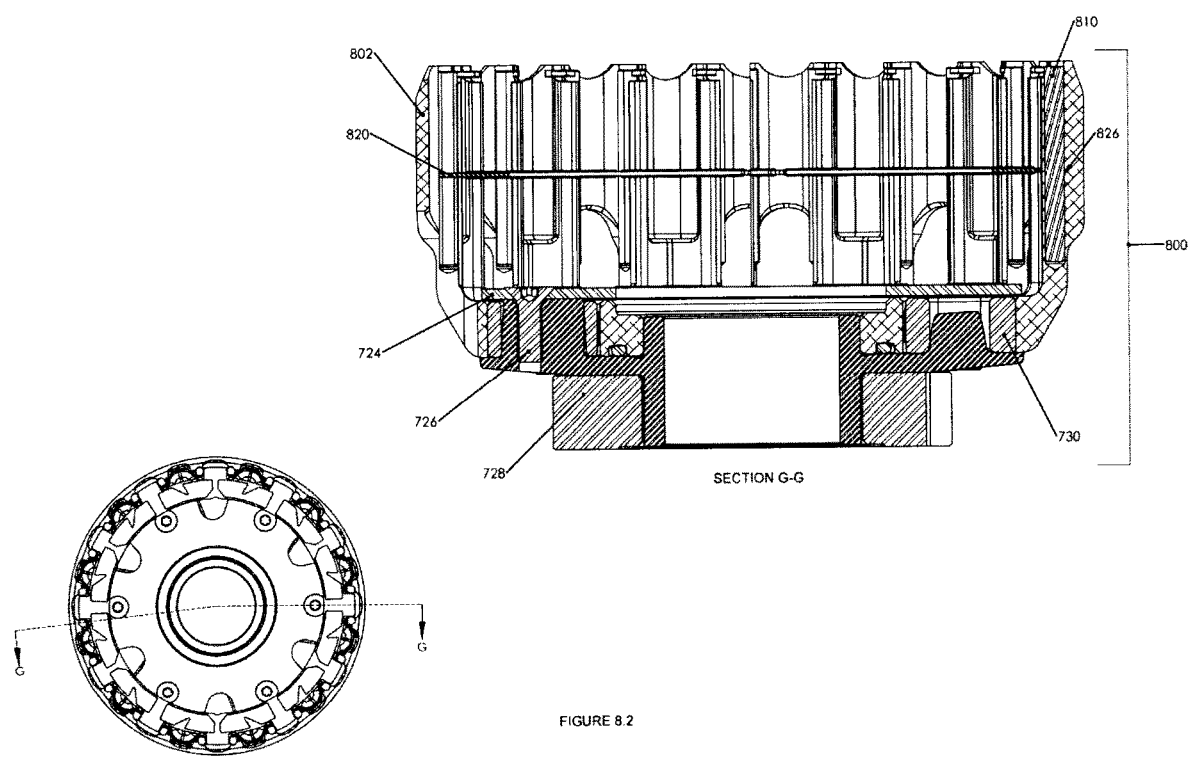
FIGURE 8.2

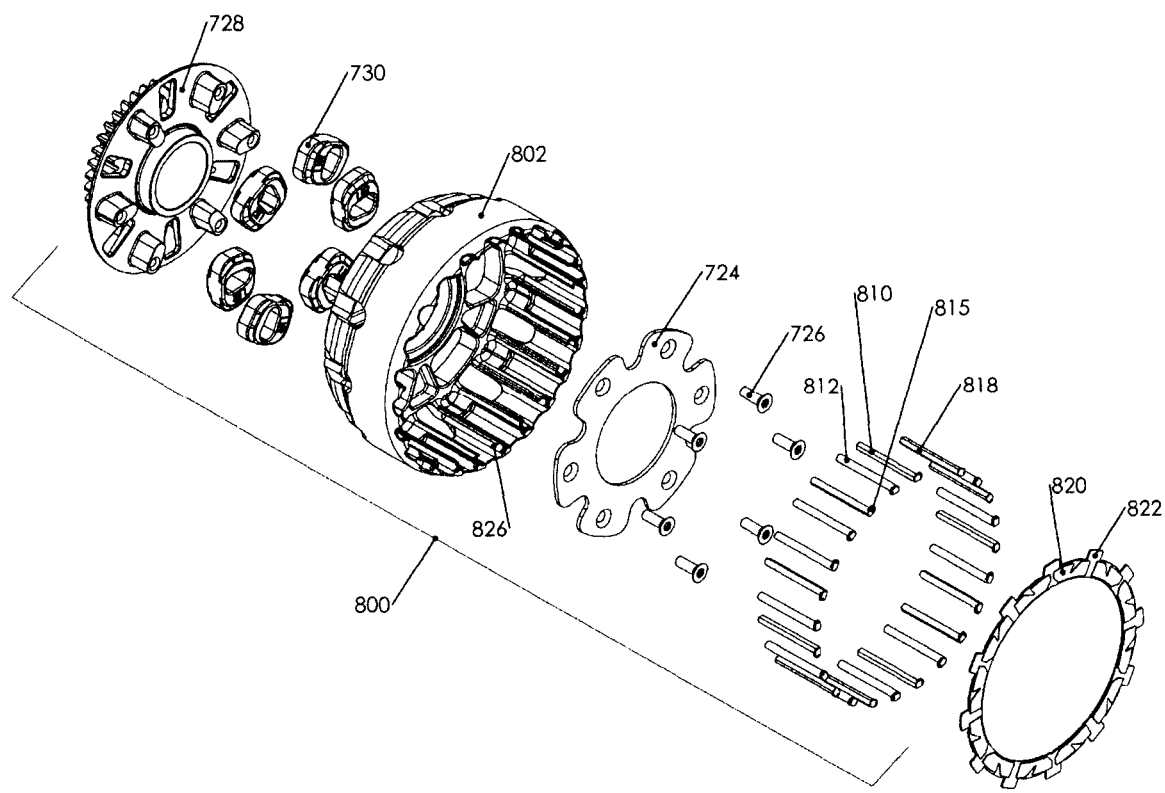
FIGURE 8.3

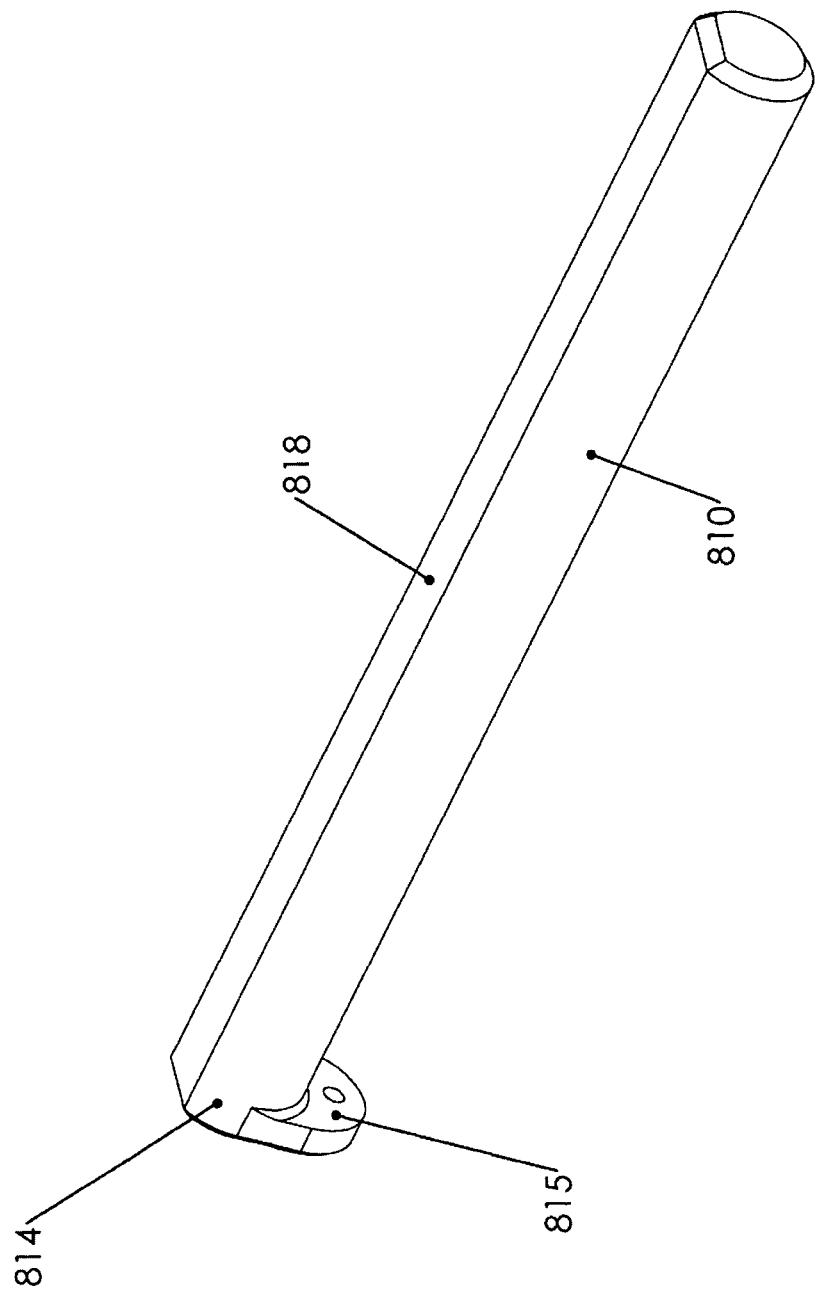
FIGURE 8.4

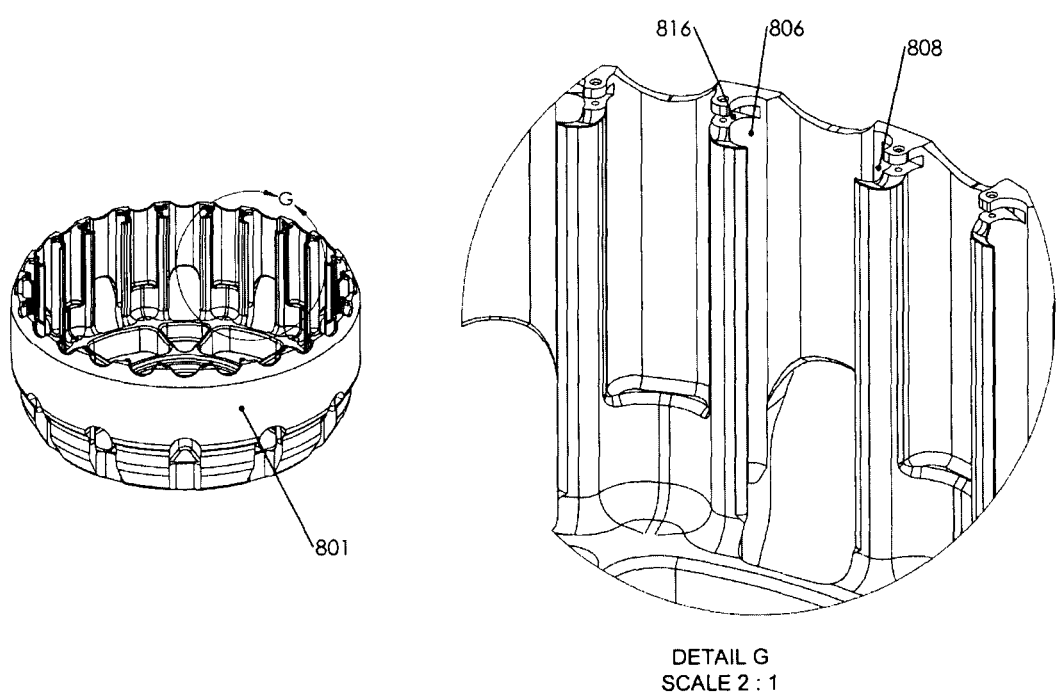
DETAIL G
SCALE 2 : 1
FIGURE 8.5

CLUTCH BASKET ASSEMBLY

CLAIM TO PRIORITY

This application claims the benefit of U.S. Provisional Application No. 62/930,494, filed Nov. 4, 2019, the disclosure of which is incorporated by reference.

TECHNICAL FIELD

The presently disclosed technology relates to vehicle clutches, and more particularly to clutches with multi-plate clutch packs.

BACKGROUND

This invention relates to a clutch system of the friction type placed in a power transmission system. Typical clutch systems include a clutch input such as a clutch basket, a clutch output such as a center clutch or clutch hub, and one or more plates making up a clutch pack and disposed between the clutch input and clutch output. When the clutch pack is compressed, the clutch input and clutch output become rotationally coupled. The clutch pack is typically compressed by a pressure plate; the pressure plate typically providing a compressive force via a spring mechanism or through a centrifugally actuated mechanism.

A clutch pack is typically made up of two types of plates—driving plates and driven plates. Driving plates are commonly referred to as friction discs and are coupled rotationally to a clutch basket. A clutch basket is typically coupled to an input from a motor. Driven plates are commonly referred to as separator plates and are coupled rotationally to a clutch hub. Separator plates are commonly constructed of steel. A clutch hub is typically coupled to an output such as a transmission. Typically, such clutch systems include a clutch disengagement system consisting of a clutch lever mechanically coupled to the pressure plate such that when the clutch lever is actuated, the pressure plate's compressive force on the clutch pack is removed, disconnecting the rotational coupling between the clutch input and clutch output. Clutch disengagement systems typically couple the clutch lever to the pressure plate mechanically through a hydraulic actuation system or a cable actuation system.

The clutch system incorporated in a 2011 Honda CRF-450R represents a typical prior art clutch system utilizing a clutch cable and a cast aluminum clutch basket assembly. Clutch basket assemblies typically have a starter gear, a driven gear or ring gear, a backing plate, cushions or springs, rivets or screws, and a cast aluminum basket housing. Basket housings are generally constructed of aluminum either by a casting process, or in some cases machined from wrought aluminum. Basket housings are often made of aluminum for its light weight and reasonable strength and cost. The starter gear typically presses into a center bore feature within the basket housing. The driven gear has cutouts to accommodate the springs or cushions and the basket housing has features for locating the cushions or springs.

When assembled, the starter gear is pressed into a center bore of the basket housing where often there are indexing features between to two in order to prevent relative rotation between the two parts. The driven gear is typically butted to the backside of the basket housing and is limited axially due to a backing plate being mounted to boss features protruding for the backside of the basket housing. Rivets or screws affix the backing plate to the boss features therefore limiting the axially travel of the driven gear between the underside of the basking housing and the underside of the backing plate contacting the boss features. The axial travel, or float, of the driven gear between the backing plate and underside of the basket housing allow the driven gear to rotate independently from the backing plate and basket housing where are joined in unison.

Cushions or springs are located between the backing plate and underside of the basket housing and are dispersed between features in basket housing and features in the driven gear. The function of the cushions or springs is to dampen shock loading between the engine and clutch and between the clutch and clutch output. When a spike in energy is transmitted from the engine to the basket assembly through the driven gear, the cushions absorb some of this energy in order to help reduce overloading of the contact surfaces between the basket assembly and clutch disks. Conversely, if shock loading is transmitted through the clutch from the drive train connected to the clutch output the cushions dampen this shock loading coming in the opposite rotational direction back to the engine input of the clutch. Examples of shock loading which try to "back drive" the clutch opposite of the rotational direction the engine is trying to drive the clutch include landing from a jump and hitting a pothole with the driving wheel or wheels of the vehicle.

The clutch system incorporated in a 2013 KTM 350 XC-F represents a prior art clutch system utilizing a hydraulic actuation system and a one-piece steel basket which also has a starter gear and a driven gear directly integrated into the basket. In this application steel is used instead of aluminum to improve the longevity of the interface between the basket and driving clutch discs. Steel construction of a basket like this is not widely adopted due to the weight and costs disadvantages in manufacturing compared to cast-aluminum basket housings. In addition, a one-piece steel basket increases the difficulty to integrate a dampening mechanism within the clutch and in some cases eliminates the dampening mechanism altogether.

Most motorcycles incorporate a manual transmission coupled to the engine via a multi-plate clutch assembly. Typically, the multi-plate clutch is engaged and disengaged by the driver via a clutch lever mounted on the handlebar. The clutch lever operated clutch allows the driver to control the clutch engagement/disengagement. When clutch components are in good working condition, clutch lever use and feel is normal and not compromised.

A basket housing or body is typically formed from aluminum having cutouts around its periphery for locating and providing rotational coupling between the basket housing and driving clutch discs which in many cases are considered friction discs. Friction discs typically are rotationally coupled to a basket housing through external tabs which protrude from the outer periphery of a friction disc where the external tabs index in to corresponding cutouts in the outer wall of a basket housing. The aluminum construction of a basket housing is generally preferred because aluminum is of relatively light weight while maintaining adequate strength for carrying the torque load transmitted between the engine and clutch output via the interleaved clutch plates of a clutch pack. A downside to aluminum basket housings is over time the contacting surfaces between friction disc tabs and the cutouts in the basket begin to wear leading to notching or grooving of the basket housing cutouts. These grooves or notches being formed can cause the friction discs to bind or get hung up during the operation of the clutch lever to override the clutch making disengagement of the clutch suboptimal when the clutch lever is used to disengage the clutch. In extreme cases the clutch can drag excessively even when the clutch lever is activated fully not allowing for complete disengagement of the engine from the transmission.

U.S. Pat. No. 10,180,165 discloses a liner with friction disc which helps protect the basket housing from the rotational contact of the friction disc coupling features. Liners like these prevent a standard basket housing from getting grooved or notched from friction disc coupling features, however they have some limitations. One such limitation includes only being able to be used with baskets in a like new condition. If the side walls of the basket cutouts are already worn or notched, the side legs of the liner will not have full support and can fracture. In addition, these types of liners require additional axial room to accommodate the axial float the liner has relative to the basket housing. The axial movement of the liner relative to the basket housing is limited by the bottom most friction disc placed atop a center clutch flange. In some clutch designs the basket cutouts into which the liners fit to are significantly below the underside of the bottom most friction disc. This results in the liner being able to float upward until it contacts the underside of the bottom most friction disc in a clutch pack. In some cases a spacer is required to space the engine cover out further than originally spaced to accommodate said liner axial movement.

Torque loads can be applied and reversed rapidly due to shock loads imparted on the drive train of the vehicle. These shock loads are caused by rapid acceleration or deceleration of the motor driving the clutch, or from events causing sudden stoppage of the drive train such as landing from a jump at high speeds. The shock loads impart an impact load to each component rotationally coupled within a clutch assembly. As mating features between parts within the clutch wear the relative movement between parts increase thus further amplifying the impact loads transmitted between parts from shock loads. Specifically wear of a basket housing where friction discs couple rotationally to it can also result in clutch noise and as the user re-engages the clutch through the disengagement mechanism.

Therefore a need exists for a clutch basket housing which provides serviceable contact surfaces or coupling features between the basket housing and corresponding coupling features of a friction discs while eliminating the drawbacks of the prior art liner systems.

It is therefore an object of the present invention to provide an improved clutch basket assembly to minimized wear from contact with friction discs while also improving the engagement and disengagement characteristics (clutch lever feel and/or modulation) the rider experiences when using the clutch lever to manually engage and disengage the clutch.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

The disclosed technology is a clutch basket assembly including an improved wear resistance and replaceability. This basket assembly is designed to work in a clutch, such as those that are used in motorcycles. These types of clutches have a clutch basket, a clutch pack, a center clutch, and a pressure plate. The clutch basket being coupled to an input and the center clutch being coupled to an output. When the clutch pack is compressed, the clutch basket and center clutch become rotationally coupled. The clutch pack is compressed by the pressure plate; the pressure plate provides a compressive force via a spring mechanism or through a centrifugally actuated mechanism.

The clutch pack is made up of two types of plates driving plates and driven plates. Driving plates are commonly referred to as friction discs and are coupled rotationally to a clutch basket. Driven plates are commonly referred to as separator plates and are coupled rotationally to the center clutch. Optionally, the driving plates can be formed without friction material and the friction material can be attached to the driven plates. The clutch basket has fingers and slots between the fingers. The clutch basket is operatively attached to the motorcycle motor. The clutch hub is operatively attached to the motorcycle transmission, and eventually to one or more wheels. The clutch system includes a clutch disengagement system consisting of a clutch lever mechanically coupled to the pressure plate such that when the clutch lever is actuated, the pressure plate's compressive force on the clutch pack is removed, disconnecting the rotational coupling between the clutch input and clutch output.

The disclosed clutch basket assembly is made up of a generally round structure including features for locating and attaching wear liners or drive members to the clutch basket body such that the liners or drive members are non-moveable, or with only small movement allowed relative to the clutch basket body. Furthermore, the wear liners or drive members provide features for coupling and accepting torque loads from friction discs, also known as driving plates or discs, within a clutch pack; in turn the wear liners or drive members will transmit the torque loads from the friction discs to the clutch basket body. The wear liners are generally cylindrically shaped at one end with a substantial portion of the wear liner having a semi-circular cross-section continuing to the opposite end of the wear liner where the wear liner will provide features for securing the wear liner to the basket body. The wear liners are referred to as pins throughout this document.

Optionally, cylindrical shaped wear liners (pins) slide or press into recesses along the vertical walls of a basket while one end of the drive members can be located or even clamped in place using a driven gear. Alternatively a plate or series of plates can be used to hold the wear liner head into its respective recess within the basket body. The head of a wear liner contains a flat interrupting the cylindrical profile of its head. The basket body has corresponding feature that couple to the wear liner head locating the wear liner head such that it cannot rotate about the wear liner center of axis.

What is further disclosed is an improved clutch system having a series of removable pins configured for engagement with the friction tabs of a friction disc of a clutch basket assembly. The removability of the pins provides facilitates the removal of the pins when the pins have worn through use of the clutch. The clutch system having a generally cylindrical clutch basket comprising a sidewall, a closed first end and an open second end. A plurality of removable pins are attached to or positioned on the sidewall. A plurality of friction discs are positioned in the clutch basket. The friction discs have a plurality of positioning tabs extending out from a periphery of each of the friction discs. The positioning tabs are configured for engagement with at least one adjacent removable pin that is removably attached to the sidewall. The sidewall can be a continuous structure, configured in multiple separate sections, and/or can include openings that span the width of the sidewall.

In a preferred embodiment each of the positioning tabs of the friction discs is configured for engagement with a single pin. The single pin is configured to engage with a depression in the friction tab. In a preferred embodiment the side wall has a plurality of depressions. A removable pin is removably positioned within each depression to provide a liner of each depression. The positioning tabs of the friction discs are configured to match a profile of the depression. The positioning tabs are each positioned within one of the depressions such that the engagement of the positioning tabs with the pins causes the friction disc to rotate with the rotation of the clutch basket.

In a further preferred embodiment the side wall has a plurality of depressions, wherein a single removable pin is positioned within each of the depressions. A surface of the pin is configured for engagement with a positioning tab of the driven disc. The surface of the pin extends beyond an inner surface of the side wall of the clutch basket. In this embodiment the pin protrudes beyond the side wall and is engaged with a depression of the positioning tab of the friction disc such that the friction disc and clutch basket rotate together.

The removable pins can be configured to attach to the clutch basket by a variety of mechanisms. The removable pins can be configured to attach by threaded connection to the clutch basket. This includes by a female threaded opening in the clutch basket that threadingly mates with a male threaded post at the end of a pin. Alternatively the clutch basket can include a threaded post configured to mate with a female threaded opening of a pin. The pins can be configured to be positioned into or onto the side wall of the clutch basket either from a first end (closed bottom) or second end (open top) of the clutch basket. In a preferred alternate embodiment the side wall has a plurality of pin dowels on an interior surface of the side wall. In this embodiment the pins are configured as a sleeve with an open lower end configured to slide over a pin dowel. In a preferred embodiment an upper end of each pin is open allowing for an end of the pin dowel to protrude through the opening. A clip secures the pin on the pin dowel to prevent axial movement of the pin. In a preferred embodiment the clip is a retaining ring.

In an alternate preferred embodiment the clutch basket utilizes two opposing removable pins attached to the sidewall or positioned on the sidewall to engage each of the positioning tabs on opposing sides of each of the positioning tabs. In a preferred embodiment each of the removable pins has a generally flat side. Each of the positioning tabs has one or more generally flat sides configured to match the generally flat side of each of the removable pin that engages the tab.

In a preferred embodiment the side wall has a plurality of depressions. Preferably the depressions are configured generally in the shape of a profile of the positioning tabs. In a preferred embodiment the depressions have two opposing side walls. Each of the opposing side walls has a channel configured for insertion of a removable pin. In a preferred embodiment the channel has a tab at a first end of the channel. The tab is configured to prevent axial movement of a pin installed in the channel. In a further preferred embodiment the channel has a slot positioned at a first end of the channel. The slot is configured to receive a tab at a first or upper end of each removable pin. Positioning of the tab into the slot prevents axial movement of the pin in the slot. In a further preferred embodiment the clutch system has a positioning plate configured for retaining each of the pins in its respective slot. The positioning plate generally has an equivalent diameter as a friction disc.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

BRIEF DESCRIPTION OF THE DRAWINGS

FIG. 1b is a section view of the prior art clutch shown in FIG. 1,

FIG. 2b is an exploded view of a standard prior art clutch incorporating the clutch basket assembly of FIG. 2a.

FIG. 2c is a section view of the prior art clutch show in FIG. 2a.

FIG. 4.1 depicts a perspective view of a clutch basket and friction disc assembly.

FIG. 4.2 depicts a sectional view of the clutch basket and friction disc assembly depicted in FIG. 4.1.

FIG. 4.3 depicts an exploded perspective of the clutch basket and friction disc assembly depicted in FIG. 4.1 relative to external clutch parts.

FIG. 4.4 depicts a perspective of the pin depicted in FIG. 4.1

FIG. 4.5 depicts a perspective detailed view of the interior side wall of the clutch basket depicted in FIG. 4.1.

FIG. 5.1 depicts a perspective view of a clutch basket and friction disc assembly.

FIG. 5.2 depicts a sectional view of the clutch basket and friction disc assembly depicted in FIG. 5.1.

FIG. 5.3 depicts an exploded perspective of the clutch basket and friction disc assembly depicted in FIG. 5 relative to external clutch parts.

FIG. 5.4 depicts a perspective view of the pin depicted in FIG. 5.1

FIG. 5.5 depicts a perspective detailed view of the interior side wall of the clutch basket depicted in FIG. 5.1.

FIG. 6.1 depicts a perspective view of a clutch basket and friction disc assembly FIG. 6.2 depicts a sectional view of the clutch basket and friction disc assembly depicted in FIG. 6.1.

FIG. 6.3 depicts an exploded perspective of the clutch basket and friction disc assembly depicted in FIG. 6 relative to external clutch parts.

FIG. 6.4 depicts a perspective view of the pin depicted in FIG. 6.1

FIG. 6.5 depicts a perspective detailed view of the interior side wall of the clutch basket depicted in FIG. 6.1.

FIG. 7.1 depicts a perspective view of a clutch basket and friction disc assembly.

FIG. 7.2 depicts a sectional view of the clutch basket and friction disc assembly depicted in FIG. 7.1.

FIG. 7.3 depicts an exploded perspective of the clutch basket and friction disc assembly depicted in FIG. 7.1 relative to external clutch parts.

FIG. 7.4 depicts a perspective view of the pin depicted in FIG. 7.1

FIG. 7.5 depicts a perspective detailed view of the interior side wall of the clutch basket depicted in FIG. 7.1.

FIG. 8.1 depicts a perspective view of a clutch basket and friction disc assembly.

FIG. 8.2 depicts a sectional view of the clutch basket and friction disc assembly depicted in FIG. 8.1.

FIG. 8.3 depicts an exploded perspective of the clutch basket and friction disc assembly depicted in FIG. 8.1 relative to external clutch parts.

FIG. 8.4 depicts a perspective view of the pin depicted in FIG. 8.1

FIG. 8.5 depicts a perspective detailed view of the interior side wall of the clutch basket depicted in FIG. 8.1.

DETAILED DESCRIPTION OF THE PREFERRED EMBODIMENTS

Figure 1A:
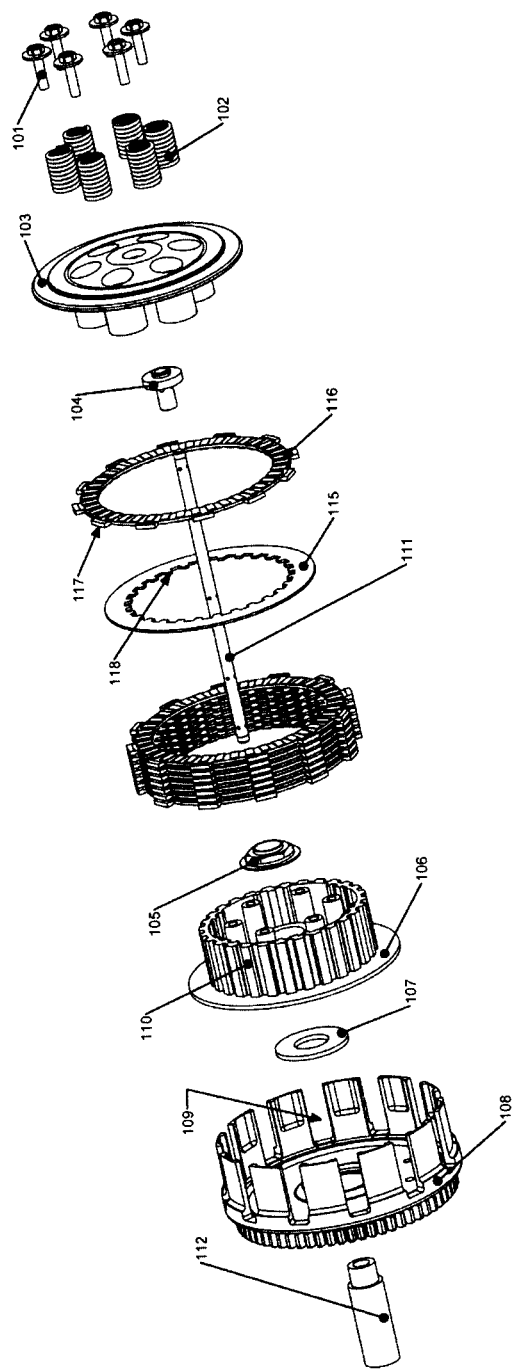
FIG. 1a is an exploded view of a standard prior art clutch.

While the presently disclosed inventive concepts) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Clutch baskets or basket assemblies are well known in the art and are typified by those used in clutches found in motorcycles and ATV's produced by Honda, KTM, Yamaha, Kawasaki and Suzuki among others.

A clutch basket is used within a typical clutch system comprised of a clutch input such as a clutch basket, a clutch output such as a clutch hub, a pressure plate and one or more disks making up a clutch pack and disposed between the clutch input and clutch output. When the clutch pack is compressed, the clutch input and clutch output become rotationally coupled. Such clutch systems typically include a clutch disengagement system consisting of a clutch lever mechanically coupled to the pressure plate such that when the clutch lever is actuated, the pressure plate's compressive force on the clutch pack is removed, disconnecting the rotational coupling between the clutch input and clutch output. Clutch disengagement systems typically couple the clutch lever to the pressure plate mechanically through a hydraulic actuation system or a cable actuation system.

The present invention provides for a novel, improved clutch basket assembly utilizing wear liners or drive members attached, located into or onto features of the basket body to provide coupling between at least one friction disc and said basket such that said separator friction disc can transmit torque loads through said drive member to said basket. Multiple embodiments are disclosed.

FIG. 1a is an exploded view of a prior art clutch. The configuration of the clutch basket assembly 108, clutch hub thrust washer 107, clutch hub 106, transmission input shaft 112, clutch hub nut 105, throw-out 104, throw-out rod 111, friction disc 116, separator plate 115, pressure plate 103, standard springs 102 and spring bolts 101 are typical of most modern motorcycle clutches, this structure is commonly employed in many types of power transmission devices.

Clutch pack 120 is comprised of friction disks 116 and separator plates 115. The clutch basket assembly 108 contains slots 109 which receive the friction disc tabs 117 and thus coupling the clutch basket assembly 108 and friction disks 116 rotationally. The clutch hub 106 contains a profiled ring 110 which provides rotational coupling to the teeth 118 of the separator plates 115. The clutch assembly 108 is typically coupled rotationally to a power input source such as an engine and the clutch hub 106 is typically coupled rotationally to an output such as a transmission through a transmission input shaft 112. In another embodiment the clutch basket assembly 108 is coupled rotationally to an output and the clutch hub 106 is coupled rotationally to a power input. Typically the clutch basket assembly 108 contains an opening in the center for receiving a transmission input shaft 112; the clutch basket assembly 108 is configured with a bearing between the clutch basket assembly 108 and the transmission input shaft so that the clutch basket assembly 108 can rotate independently of the transmission input shaft with minimal friction. Typically a clutch hub thrust washer 107 is disposed between a clutch hub 106 and the clutch basket assembly 108. A clutch hub nut 105 secures the clutch hub 106 against the clutch hub thrust washer 107 which in turn is secured against a shoulder (not shown) on the transmission input shaft 112. The clutch hub is typically rotationally coupled to the transmission input shaft 112 via a suitable spline.

FIG. 1b is a section view of the prior art clutch shown in FIG. 1. As best seen in FIG. 2, the clutch pack 120 is comprised of eight friction disks 116 and seven separator plates 115. The clutch pack 120 establishes the distance between the pressure plate flange face 202 and clutch hub flange face 205. The standard springs 102 act on the pressure plate 103 to compress the clutch pack 120 forcing the adjacent surfaces of the friction disks 116 and separator plates 115 to become coupled rotationally and in turn coupling the basket 108 and clutch hub 106 rotationally. The throw-out 104 is coupled to a throw-out rod 111. The throw-out rod 111 is coupled to a clutch disengagement system (not shown). The clutch disengagement system (not shown) is operable to selectively position the throw-out rod 111 and throw-out 104 for the purpose of pushing the pressure plate 103 away from the clutch pack 120 to disengage the clutch. Alternatively, the clutch disengagement system (not shown) is operable to selectively position the throw-out rod 111 and throw-out 104 for the purpose of returning the pressure plate 103 into contact with the clutch pack 120 to engage the clutch. In another embodiment the clutch pack 120 is comprised of nine friction disks 116 and eight separator plates 115. In the preferred embodiment the clutch pack 120 is comprised of eight 3-millimeter thick friction disks 116 and seven 1.6-millimeter separator plates 115 resulting in the clutch pack 120 being approximately 35.2-millimeters tall. In other prior art the clutch pack 120 is less than 35-millimeters tall and is comprised of eight friction disks and seven separator plates that are less than 1.6-millimeters thick. In yet other prior art, the clutch pack 120 is taller than 35.2 millimeters and is comprised of nine friction disks which are approximately 4-millimeters thick and eight separator plates which are approximately 2-millimeters thick.

Figure 2A:
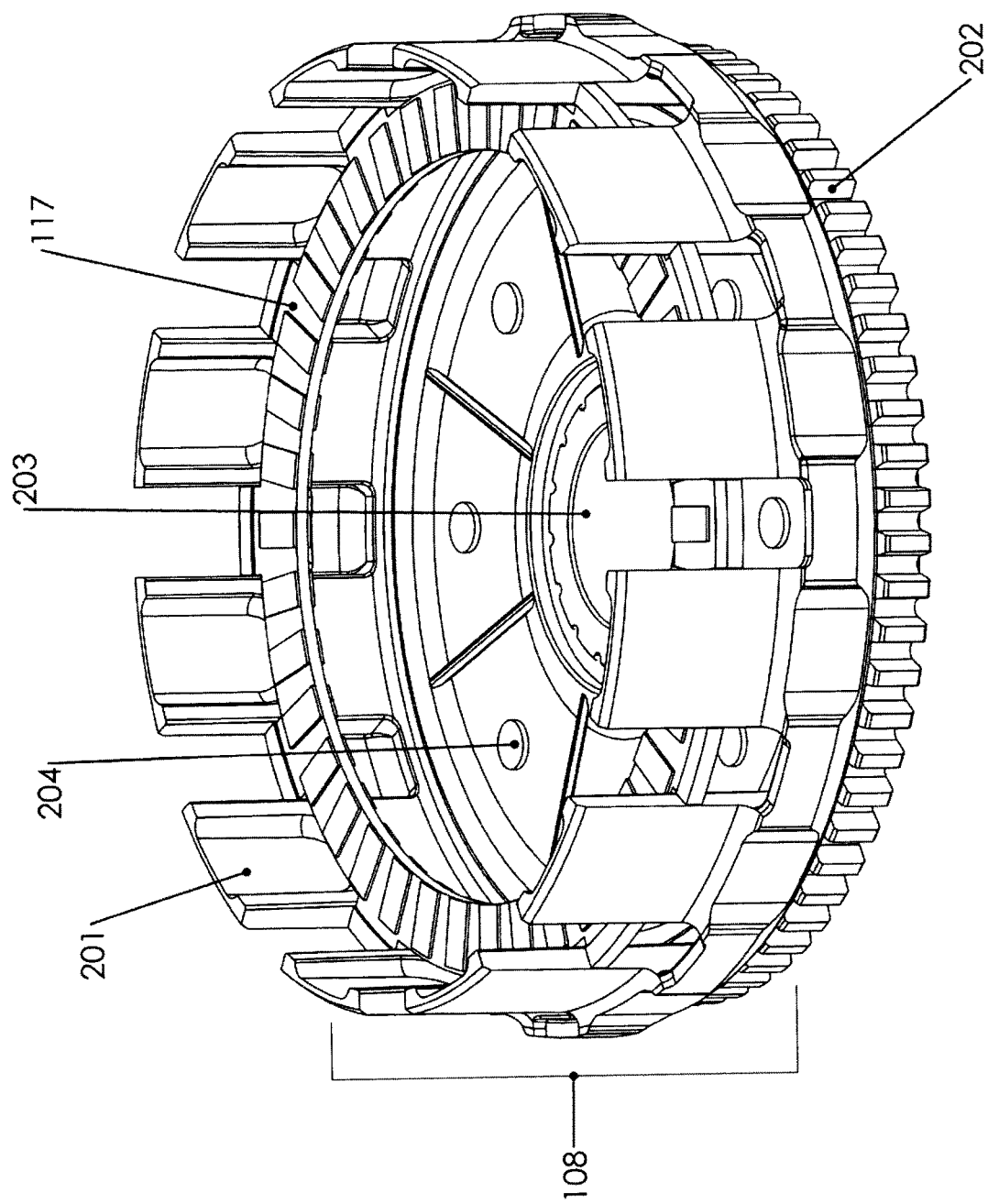
FIG. 2a is an isometric view of an H450 prior art clutch basket assembly.

FIG. 2a is an isometric view of the clutch basket assembly 108 and a friction disc 117 showing the rotational coupling between the basket assembly 108 external tabs of the friction disc 117.

Figure 2B:
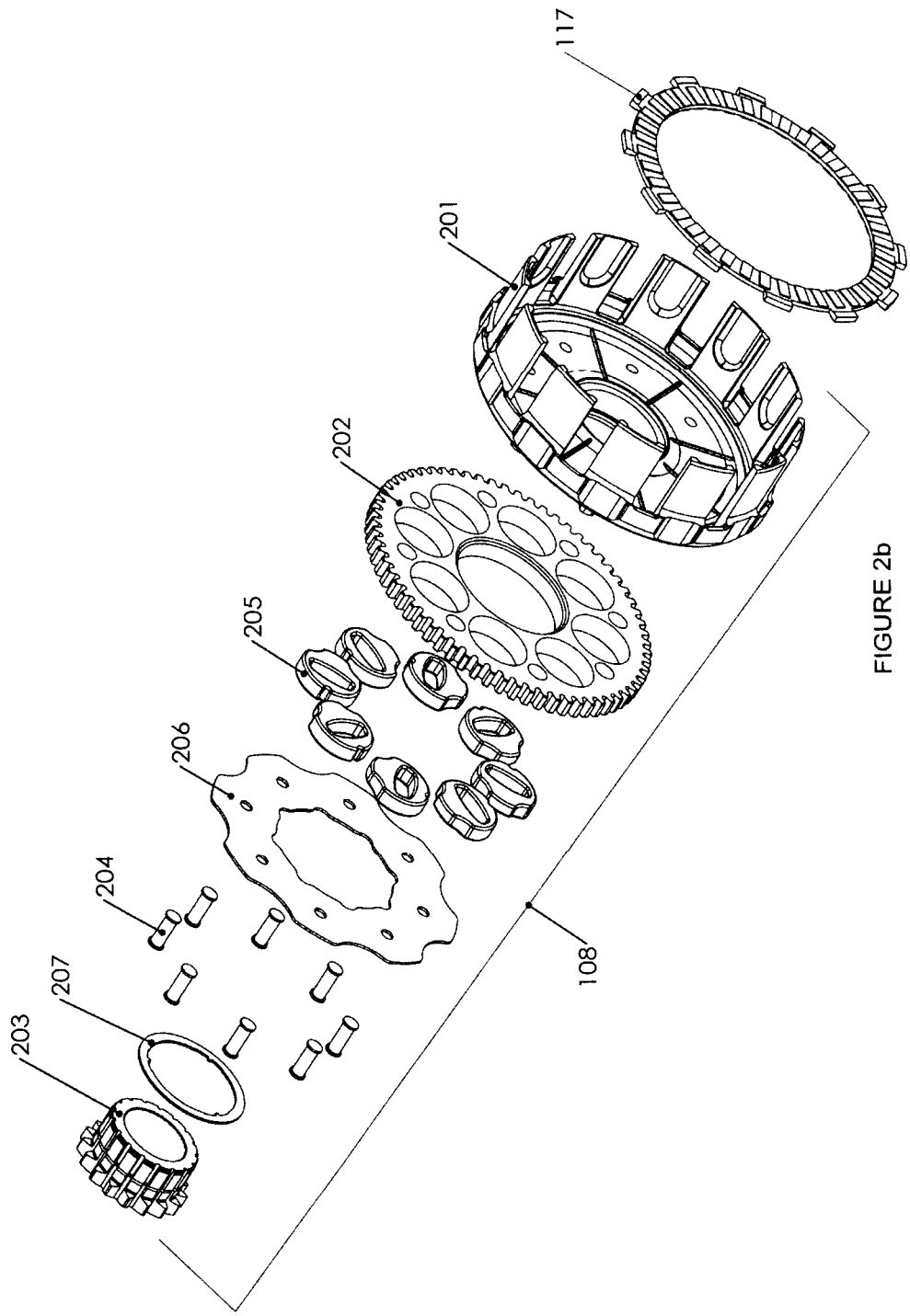

FIG. 2b is an exploded isometric view of the basket assembly 108 and friction disc 117. FIG. 2B shows the basket housing 201, driven gear 202, cushions 205, backing plate 206, rivets 204, spacer 207 and starter gear 203. In some screws are used place of the rivets 204.

Figure 2C:
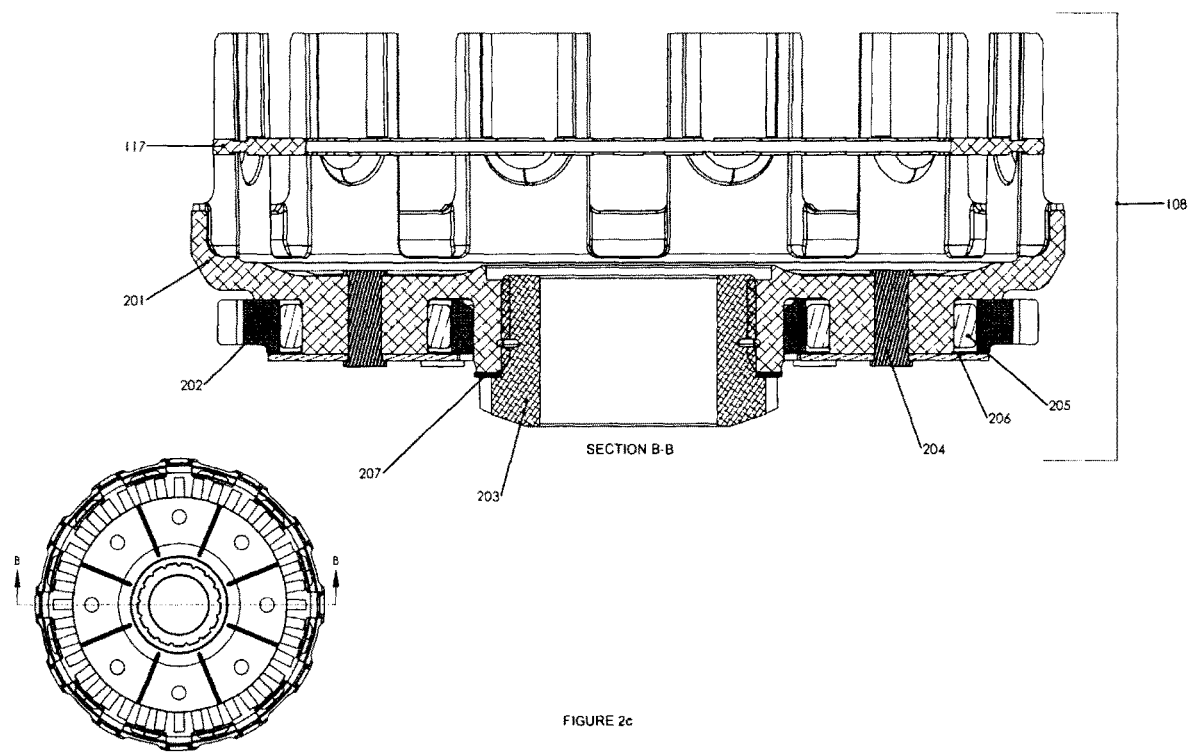

FIG. 2c is a section view of the basket assembly 108 and friction disc 117 where the friction disc is shown indexed and positioned inside of the basket housing 201 into the basket assembly 108. In FIG. 2C the basket assembly 108 is shown in its assembled state providing detail for how the various components of the basket assembly 108 relate to on another. The starter gear 203 is pressed into a corresponding inner bore of the basket housing 201 with the spacer 207 located between the basket housing 201 and starter gear 203. In some embodiments the spacer 207 is omitted and the starter gear 203 can directly contact the basket housing 201 in the area the spacer 207 is shown occupying. The cushions 205 are placed over boss features of the basket body 201 within holes of the driven gear 202. The driven gear 202 is shown contacting the underside of the basket body 201 making visible a gap between the backing plate 206 and driven gear 202. The backing plate 206 is affixed to the basket body 201 with rivets 204. The gap between the driven gear 202 and backing plate 206 signifies that the driven gear 202 can move axially relative to the basket body 201 which allows the driven gear 202 to rotate radially relative to the center of axis of the basket body 201 compressing the cushions 205 against their respective mating features protruding from the basket body 201. When engine (not shown) accelerates the driven gear 202 in a 1$^{st}$ direction the cushions 205 absorb the acceleration loading from the engine. Conversely, when loads are applied in a second direction from the clutch output back through the clutch assembly the cushions 205 dampen these loading conditions to protect the coupling features between mating clutch parts including the tabs of the friction disc 117 and corresponding cutouts of the basket body 201 along with protecting the engine connected through the driven gear 202.

FIGS. 4.1 to 4.5 illustrate a preferred embodiment of a Clutch basket and friction disc assembly 400 utilizing a series of twelve removable pins. The clutch basket and friction disc assembly 400 has a clutch basket 402 having a side wall 404. Twelve pins are removably attached to the clutch basket at the side wall of the clutch basket. The pins are positioned within slots or depressions 408 in the sidewall of the clutch basket. The pins are removably attached to the clutch basket via threaded connection. In the depicted embodiment each pin has a threaded stud 418 extending from the pin 406. The threaded stud is configured to threadingly engage with a female threaded opening 410 of the clutch basket. A shoulder 420 of the pin is configured to seat against the clutch basket proximate 421 to the threaded opening Each pin in the depicted embodiment has a generally cylindrical shape. An outer surface of each pin is configured for engagement with a friction tab 412 of the friction disk. The friction disc is provided with twelve friction tabs corresponding to the twelve removable pins positioned in the side wall of the clutch basket. A depression 416 in each friction tab 412 of the friction disc is configured to match the exterior shape of the pin. The engagement of the pin to the depression in the friction disc positioning tab. Each pin projects outward from an interior wall of the sidewall of the clutch basket.

FIGS. 5.1 to 5.5 illustrate a second preferred embodiment of a clutch basket and friction disc assembly 500. The clutch basket 502 has a side wall 503 having a series of twelve depressions 504. A pin is configured to be positioned in each of the depressions in the sidewall of the clutch basket. Each pin is configured with a head 516 and a body 518. The body of the pin is configured as a partial cylinder. The partial cylinder is configured with a void 507. The pin is inserted into a slot in the sidewall of the clutch basket from a bottom or second end of the clutch basket. Each pin is retained in the sidewall at the head by the driving gear 512 on one side and by a tab 514 positioned in the clutch basket.

In the depicted embodiment the friction disc 508 has twelve friction tabs 510. The friction tabs are generally rounded and configured to match the interior surface of the partial cylinder defined by each pin.

FIGS. 6.1 to 6.5 illustrate a further preferred embodiment of an improved clutch basket assembly 600. The depicted embodiment utilizes twenty four pins configured for retaining twelve friction tabs on a friction disk. The depicted embodiment can be utilized with standard discs having standard friction tabs as known in the art. The side wall 602 of the clutch basket 601 has a series of depressions or indentations 604. Each depression in the depicted embodiment has two opposing removably attached pins 610, 612. Each pin has a head 616 and a body 618 extending away from the head. The body of each pin has a flat side 619. The flat side of each pin is configured to engage with a flat side of each friction tab 614 of the friction disc 613. In the depicted embodiment each pin is configured to be positioned within the clutch basket by inserting from the closed bottom or first end of the clutch basket toward the open top or second end of the clutch basket. The pin head has a flat 615 utilized for positioning the pin when the pin is inserted into the clutch basket. The pins are configured to be axially retained in the clutch basket by retaining discs 620, 622 positioned against the pins and by the underside tab of the head of the pins.

FIGS. 7.1 through 7.5 depict an alternate preferred embodiment of a clutch basket and friction disc assembly 700 having twelve removably attached pins. The clutch basket 702 sidewall 704 has a series of twelve pin dowels 706 attached or integral to the sidewall. Each pin 708 is configured as a sleeve having a body 722 in the shape of a partial cylinder. Each pin is configured to slide over a pin dowel such that the pin dowel occupies some or all of the void 722 in the body of the pin. The pin has a generally round or circular head 718 having an opening 732 through which an end of the pin dowel is configured to protrude. A clip, such as a snap ring, or other retaining mechanism is configured to retain the pin axially onto the pin dowel.

The friction disc 712 has twelve positioning tabs 714 that are configured with a depression 716 in each tab. The depression is configured to match the external shape of the pin to provide engagement between the tab within the depression and the exterior of the pin. Each depicted pin is configured to be positioned on the pin dowel by sliding onto the pin dowel from the top open end or second end of the clutch basket toward the closed end or first end of the clutch basket.

FIGS. 8.1 through 8.5 depict a further preferred embodiment of a clutch basket and friction disc assembly 800 utilizing twenty four pins positioned on the side wall of the clutch basket. The clutch basket 802 sidewall 804 has a series of depressions or indentations 805 configured for retaining a friction tab 822 of a friction disc 820. The depressions in the side wall have opposing slots 826 into which opposing pins 810, 812 forming a pair of opposing pins are positioned. Each pin has a head 815 and a body 814. The head 815 of each pin is configured as a tab 815 in the depicted embodiment. Each of the opposing slots has a tab retaining slot 816 extending generally perpendicular from the opposing slot into the sidewall of the clutch basket. Each tab retaining slot is configured to retain the tab of the pin head to prevent axial movement of the pin in the clutch basket. When each pin is positioned in the clutch basket, the tab of each pin head is positioned into the second slot to prevent axial movement of each pin in the clutch basket. Each pin body has a flat side 818 that is configured for engagement with a flat side of each tab of the friction disc 822.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

The invention claimed is:

1. A clutch system, said clutch system comprising:
    a generally cylindrical clutch basket comprising a sidewall, a closed first end and an open second end;
    a plurality of removable pins attached to said sidewall,
    a plurality of frictions disks mounted in said clutch basket, said friction disks comprising a plurality of positioning tabs extending out from a periphery of each friction disk;
    wherein each positioning tab is engaged with at least one removable pin of said plurality of removable pins attached to said sidewall adjacent to each positioning tab,
    wherein said positioning tabs are in a spaced apart relationship such that a section of said periphery extends between each of said tabs, wherein at least a portion of said section of said periphery is free of engagement with any removably pin of said removable pins.

2. The clutch system of claim 1, wherein each of said positioning tabs is configured for engagement with a single removable pin of said plurality of removable pins.

3. The clutch system of claim 2, wherein said side wall comprises a plurality of side wall depressions, wherein each of said removable pins is removably positioned within a single side wall depression of said plurality of side wall depressions to provide a liner to said single side wall depression of said plurality of side wall depressions, wherein each of said positioning tabs is configured to match a profile of one of said side wall depressions of said plurality of side wall depressions, wherein each of said positioning tabs is positioned within one of said side wall depressions of said plurality of side wall depressions.

4. The clutch system of claim 2, wherein said side wall comprises a plurality of depressions, wherein each removable pin is positioned within a depression of said plurality of depressions, wherein a surface of each removable pin is configured for engagement with a surface of one of said positioning tabs of said plurality of positioning tabs of said driven disc, wherein each of said plurality of positioning tabs extends beyond an inner surface of said side wall.

5. The clutch system of claim 4 wherein each positioning tab of said plurality of positioning tabs comprises a positioning tab depression configured to match a profile of each of said removable pins.

6. The clutch system of claim 2 wherein each removable pin of said plurality of removable pins is configured to attach to said clutch basked by threaded engagement.

7. The clutch system of claim 2 wherein said side wall comprises a plurality of pin dowels on an interior surface of said side wall, wherein each removable pin comprises a sleeve configured to slide over a pin dowel of said plurality of pin dowels.

8. The clutch system of claim 2 wherein each sleeve is removably attached to each pin dowel of said plurality of pin dowels by a clip.

9. The clutch system of claim 1, wherein said plurality of removable pins are arranged in opposing pairs of removable pins, wherein each positioning tab is configured for engagement with one of said opposing pairs of removable pins removably attached to said side wall of said clutch basket.

10. The clutch system of claim 9 wherein each removable pin comprises a generally flat side, wherein each positioning tab comprises a generally flat side configured to match a generally flat side of each removable pin.

11. The clutch system of claim 9, wherein said side wall comprises a plurality of depressions, wherein said depressions are generally configured in the shape of one of said locating tabs, wherein said depressions comprise two opposing side walls, wherein each opposing side wall comprises a channel configured for insertion of one of said removable pins.

12. The clutch system of claim 11, wherein said channel comprises a positioning tab at a first end of said channel, wherein said positioning tab is configured to prevent axial movement of a removable pin installed in said channel.

13. The clutch system of claim 11, wherein said channel comprises a slot positioned at a first end of said channel, wherein said slot is configured to receive a tab positioned on a first end of each removable pin, wherein said slot and said tab are configured to prevent axial movement of each removable pin when said tab is inserted into said slot.

14. The clutch system of claim 11, wherein said clutch system comprises a locating plate configured for retaining each removable pin in said slots.

15. The clutch system of claim 1, wherein said side wall of said clutch basket is configured for attachment of said plurality of removable pins by insertion of each removable pin from said open top of said clutch basket and sliding each pin toward said closed end of said clutch basket.

16. The clutch system of claim 1, wherein said side wall of said clutch basket is configured for attachment of said plurality of removable pins by insertion of each removable pin from said closed end of said clutch basket and sliding each removable pin toward said open top of said clutch basket.

* * * * *